(12) United States Patent
Carleton

(10) Patent No.: US 10,938,337 B1
(45) Date of Patent: Mar. 2, 2021

(54) SYSTEM FOR GUIDANCE AND DEPLOYMENT OF ACTIVE PANELS ON BUILDING WALLS

(71) Applicant: Thomas E. Carleton, Peabody, MA (US)

(72) Inventor: Thomas E. Carleton, Peabody, MA (US)

( * ) Notice: Subject to any disclaimer, the term of this patent is extended or adjusted under 35 U.S.C. 154(b) by 0 days.

(21) Appl. No.: 15/361,409

(22) Filed: Nov. 26, 2016

Related U.S. Application Data

(60) Provisional application No. 62/233,313, filed on Sep. 26, 2015.

(51) Int. Cl.
| | |
|---|---|
| *H02S 20/22* | (2014.01) |
| *E04B 1/344* | (2006.01) |
| *H02S 20/30* | (2014.01) |
| *G05B 15/02* | (2006.01) |

(52) U.S. Cl.
CPC ............ *H02S 20/22* (2014.12); *E04B 1/3445* (2013.01); *G05B 15/02* (2013.01); *H02S 20/30* (2014.12)

(58) Field of Classification Search
CPC ........ H02S 20/30; H02S 20/22; E04B 1/3445; G05B 15/02
See application file for complete search history.

(56) References Cited

U.S. PATENT DOCUMENTS

| | | | |
|---|---|---|---|
| 4,043,316 A | 8/1977 | Arent | |
| 4,191,165 A | 3/1980 | Faudarole | |
| 4,615,371 A | 10/1986 | Clauss | |
| 5,221,363 A | 6/1993 | Gillard | |
| 5,307,856 A | 5/1994 | Murray | |
| 5,850,131 A | 12/1998 | Wolfer | |
| 6,134,842 A | 10/2000 | Cheng | |
| 6,142,209 A | 11/2000 | Girard | |
| 6,384,314 B1 | 5/2002 | Lund-Hansen | |
| 6,423,894 B1 * | 7/2002 | Patz | B60J 7/00 136/244 |
| 6,798,158 B2 | 9/2004 | Evans | |
| 7,207,142 B2 | 4/2007 | Mullet | |
| 7,562,667 B2 | 7/2009 | Li | |

(Continued)

FOREIGN PATENT DOCUMENTS

| | | | | |
|---|---|---|---|---|
| JP | 2018048455 A | * | 5/2018 | ............ Y02B 10/12 |
| WO | WO-2011059062 A1 | * | 5/2011 | ............ F24S 25/50 |

(Continued)

OTHER PUBLICATIONS

Ohta WO2011059062A1, Machine_Translate_WO2011059062A1_Description_202006040110 (Year: 2011).*

*Primary Examiner* — Babajide A Demuren
(74) *Attorney, Agent, or Firm* — Bay State IP, LLC; Mary Steubing, Esq.

(57) ABSTRACT

A system for guidance and deployment of active panels on a building. One or more guide rails are coupled to a building wall. Panel units are coupled to the guide rails. An active panel can extend and contract from each panel unit. A control system conveys the panel units to an operational position on the building wall. When a panel unit is in operational position, The control system extends or retracts the respective active panel from the panel unit, and adjusts the angle of the panel unit relative to the building wall.

20 Claims, 17 Drawing Sheets

(56) References Cited

U.S. PATENT DOCUMENTS

| | | | |
|---|---|---|---|
| 8,008,883 B2 | 8/2011 | Hoff et al. | |
| 8,065,039 B2 | 11/2011 | Mullet et al. | |
| 8,336,264 B2 | 12/2012 | Sato et al. | |
| 8,413,946 B2 | 4/2013 | Hartelius et al. | |
| 8,511,007 B2 | 8/2013 | Powers, III | |
| 9,046,281 B2 | 6/2015 | Curran | |
| 9,074,419 B2 | 7/2015 | Schoch et al. | |
| 9,303,443 B2 | 4/2016 | Lucas | |
| 2006/0202186 A1* | 9/2006 | Rowley | E04H 17/1417 256/67 |
| 2009/0031641 A1* | 2/2009 | Grazioso | E04F 10/02 52/74 |
| 2012/0138549 A1* | 6/2012 | Choi | E04F 10/08 211/41.1 |
| 2013/0118099 A1* | 5/2013 | Scanlon | F24J 2/5233 52/173.3 |
| 2018/0062572 A1* | 3/2018 | Kunesh | H02S 20/30 |

FOREIGN PATENT DOCUMENTS

| | | | | |
|---|---|---|---|---|
| WO | WO-2012030225 A2 * | 3/2012 | | F24J 2/085 |
| WO | WO-2014179893 A1 * | 11/2014 | | F24S 25/50 |
| WO | WO-2017073576 A1 * | 5/2017 | | H02S 20/26 |

* cited by examiner

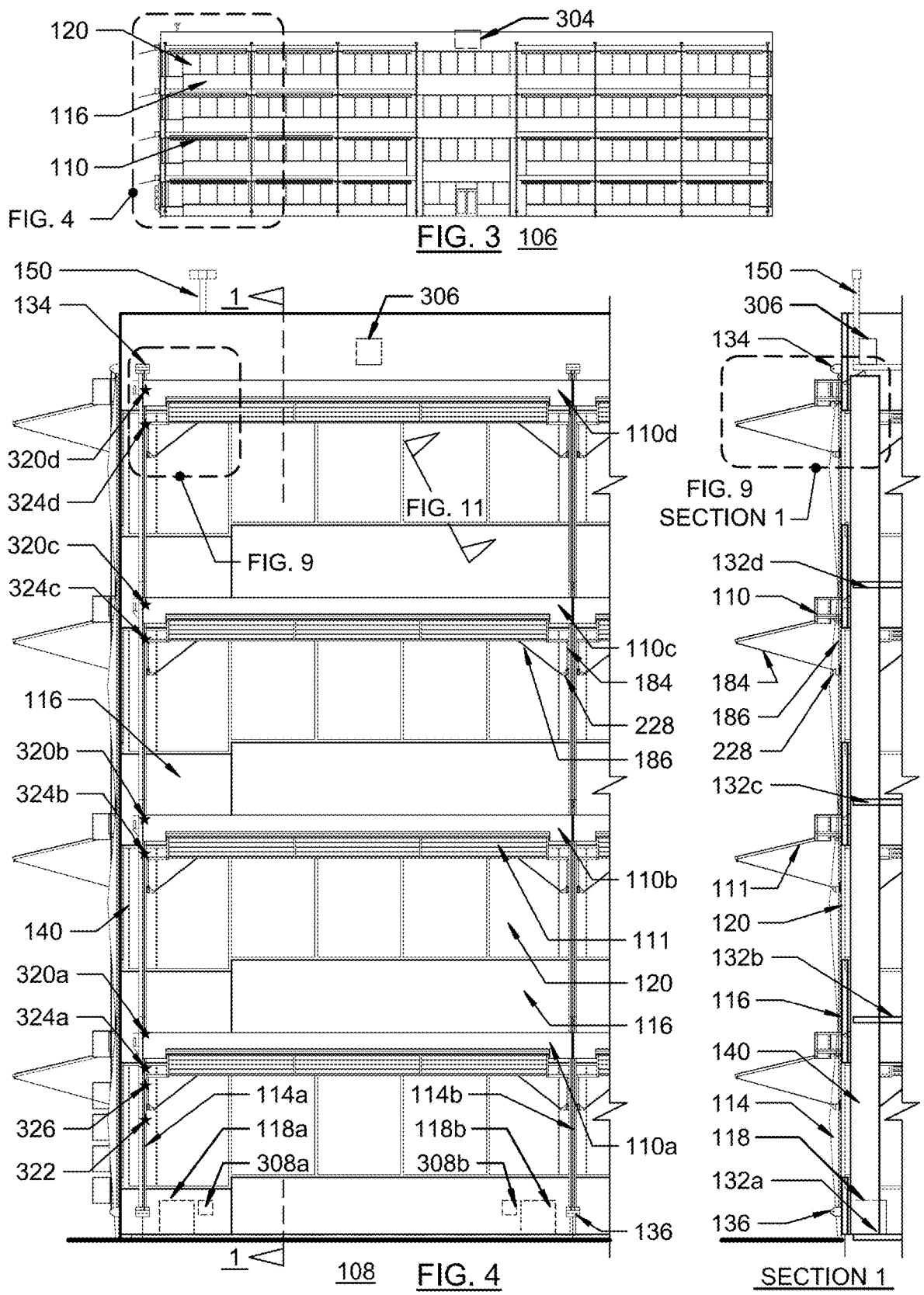

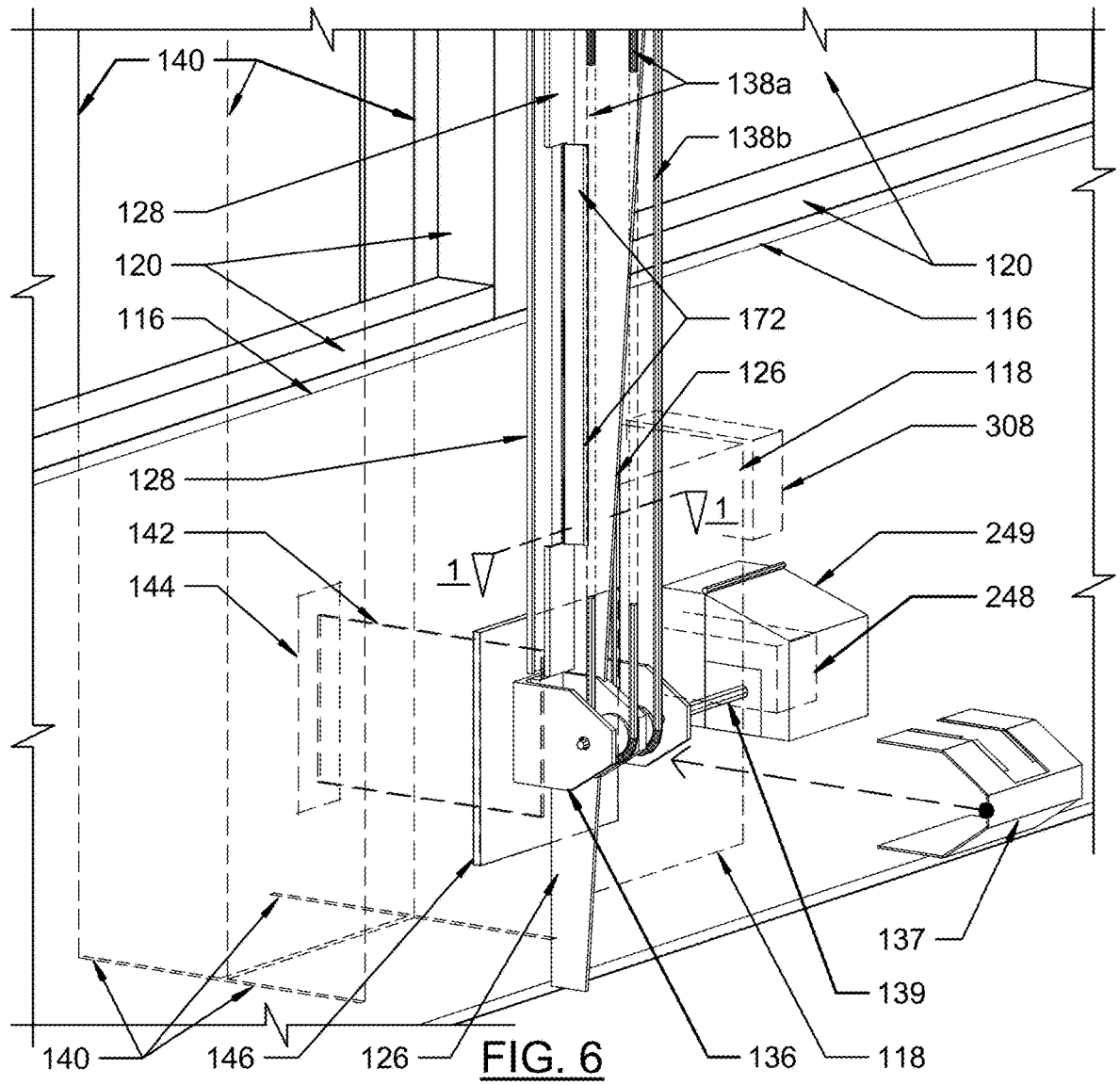
FIG. 6
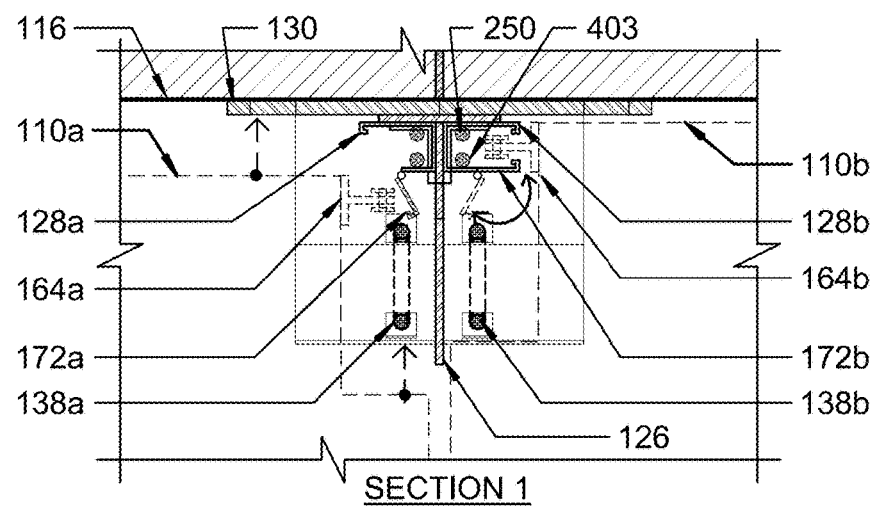
SECTION 1

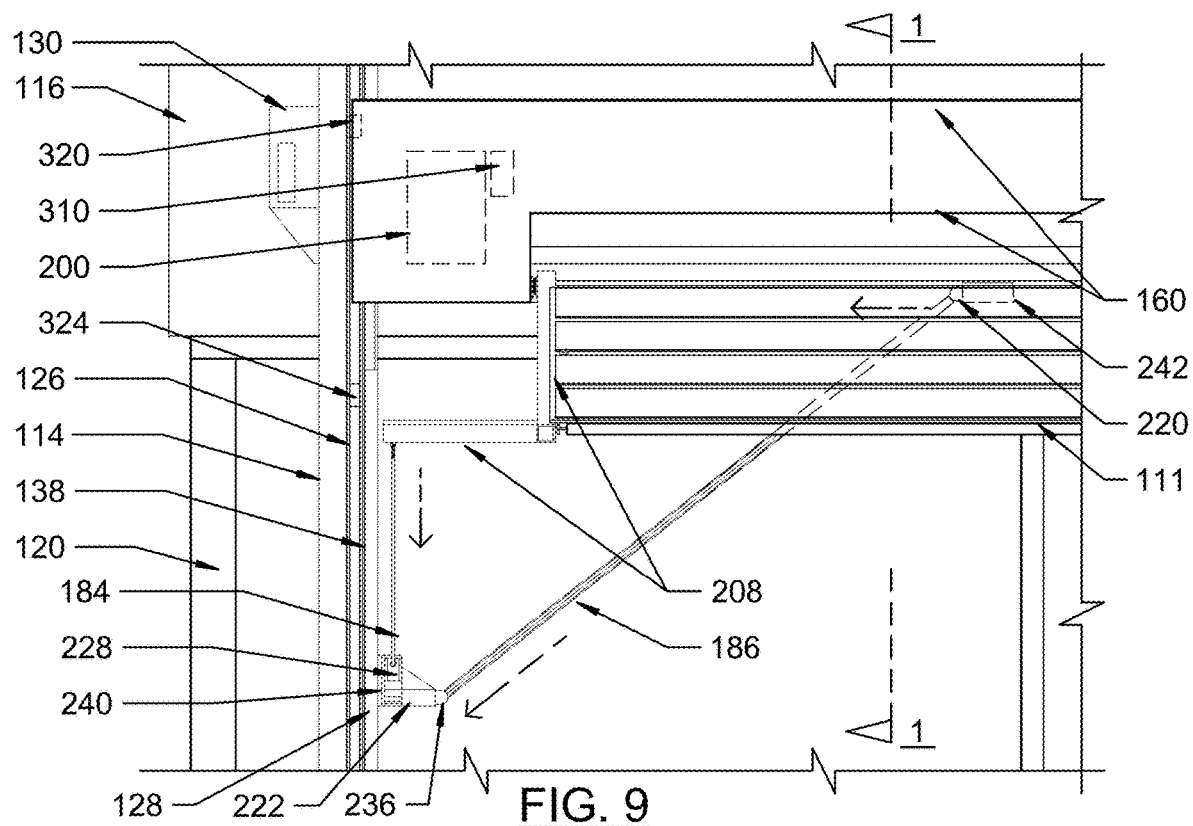
FIG. 9
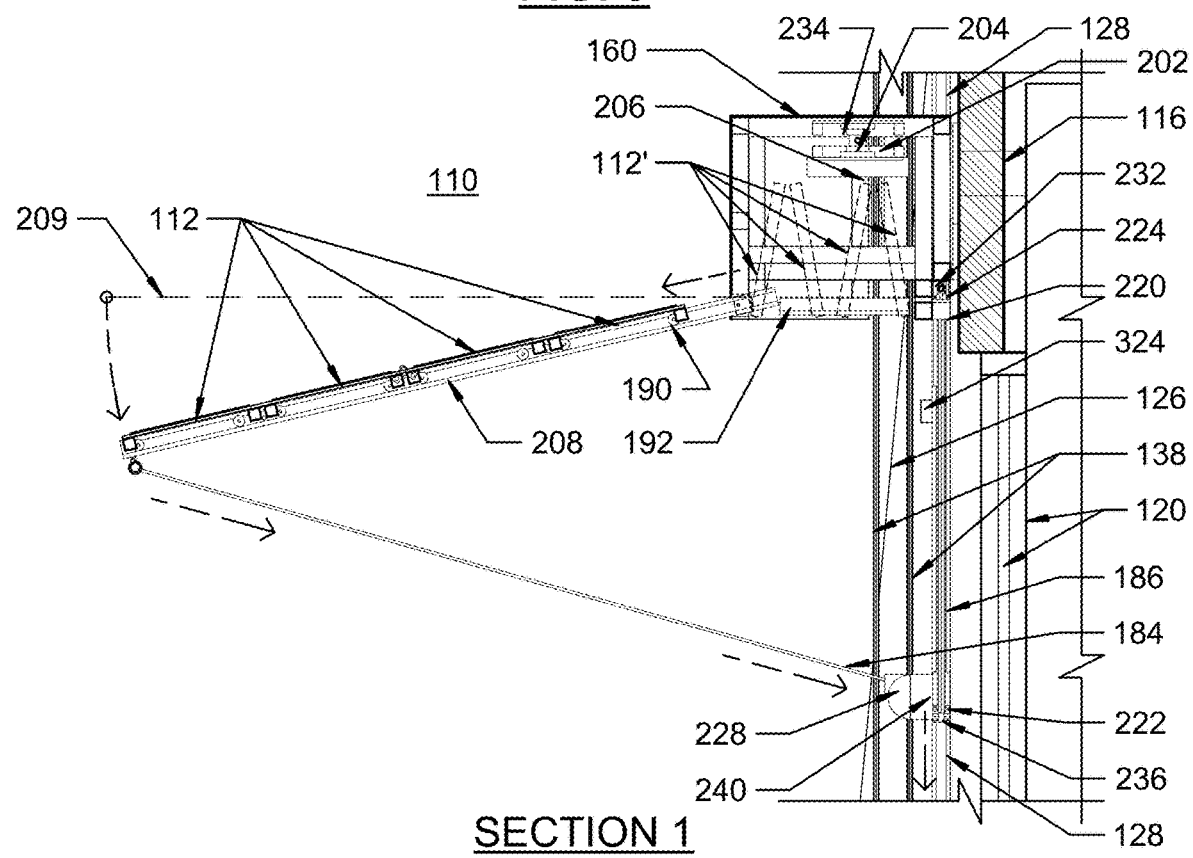
SECTION 1

US 10,938,337 B1

SYSTEM FOR GUIDANCE AND DEPLOYMENT OF ACTIVE PANELS ON BUILDING WALLS

RELATED APPLICATIONS

This application claims the benefit of Provisional Patent Application No. 62/233,313, Titled Vertical Array Photo-Voltaic Awning Barrier System, to Thomas E. Carleton, filed on 26 Sep. 2015.

FIELD

The disclosure relates generally to implementation of alternative energy technologies. More particularly, the invention relates to installation and operation of alternative energy technology systems on buildings.

BACKGROUND

As conventional energy costs increase, heating and cooling of buildings has become an economic issue drawing increasing attention. Designers of buildings now consider alternative energy sources such as photo-voltaic (PV) energy, commonly implemented as solar materials in the form of rooftop solar panels, solar shingles, and the like, to augment energy budget needs. Older buildings can however tend to be inaccessible to these technologies.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 is a front elevation view of the embodiment as shown in FIG. 1, with one assembly 106 of the automated panel guidance and deployment system 102 for the building.

FIG. 4 is a partial, magnified elevation view of the embodiment as shown in FIG. 3, with one panel section 108 of assembly 106, extending from ground level to roof level of the building. In addition, Section 1 is a cross-sectional view of panel section 108.

FIG. 6 is an isometric view at the bottom of guide rail 114 for the embodiment as shown in FIGS. 1 and 5, with connection to column 140 (dashed lines), along with motorized energy unit 118. Section 1 is a cut plan view looking downward at guide rail 114, with panel units 110a and 110b on either side.

FIG. 9 is a partial elevation view of the embodiment as shown in FIG. 4, enlarged to illustrate a greater level of detail. Section 1 is a partial section cut view of the embodiment as shown in FIG. 4, Section 1, enlarged to illustrate a greater level of detail.

DETAILED DESCRIPTION

Alternative energy technologies have emerged and continue to develop rapidly in order to provide adjunct heating and/or cooling capacity to both new and, especially, current and older buildings. Such energy technologies include but are not limited to Photo-voltaic cells, solar panels, solar fiber, solar films, and the like. Embodied herein are systems and methods that simply and conveniently apply these technologies and others to building exteriors, in order to boost energy performance, but also with additional benefits, as will be described.

Figure 1:
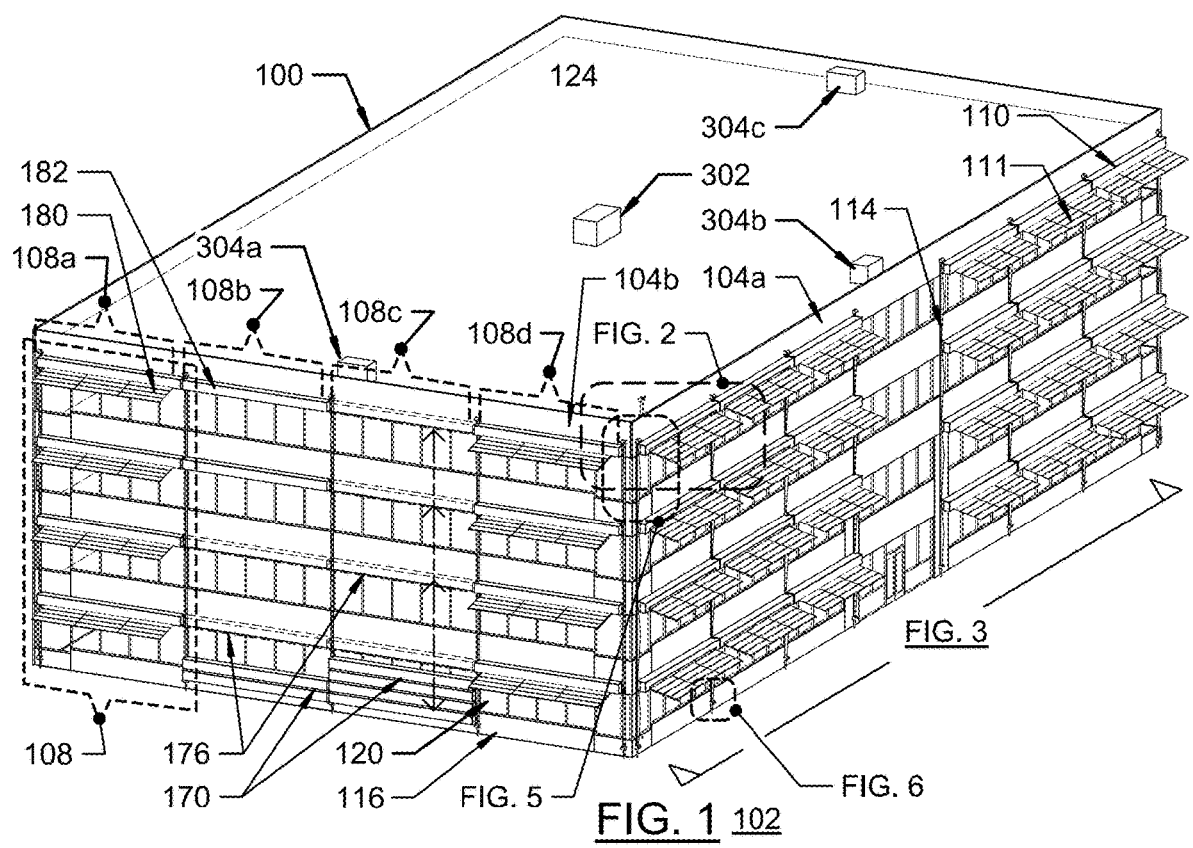
FIG. 1 is an isometric view of an embodiment of the automated panel guidance and deployment system 102, as installed at a typical office building, with panel sections 108 including panel units 110 in both operational and inactive locations as well as operational and inactive positions.

Accordingly, as seen in FIG. 1, there is shown an automated panel system 102 including one or more guide rails 114 coupled to a building wall 116. Several panel units 110 are coupled to the one or more guide rails 114. An active panel 111 is configured to extend and contract from each panel unit 110. Elements of control system 300 are coupled to the guide rails 114 and to each panel unit 110 and configured to convey the panel units to an operational location on the building wall 116, and when a panel unit is in an operational location, extend or retract the respective active panel from or into its respective panel unit.

Figure 2:
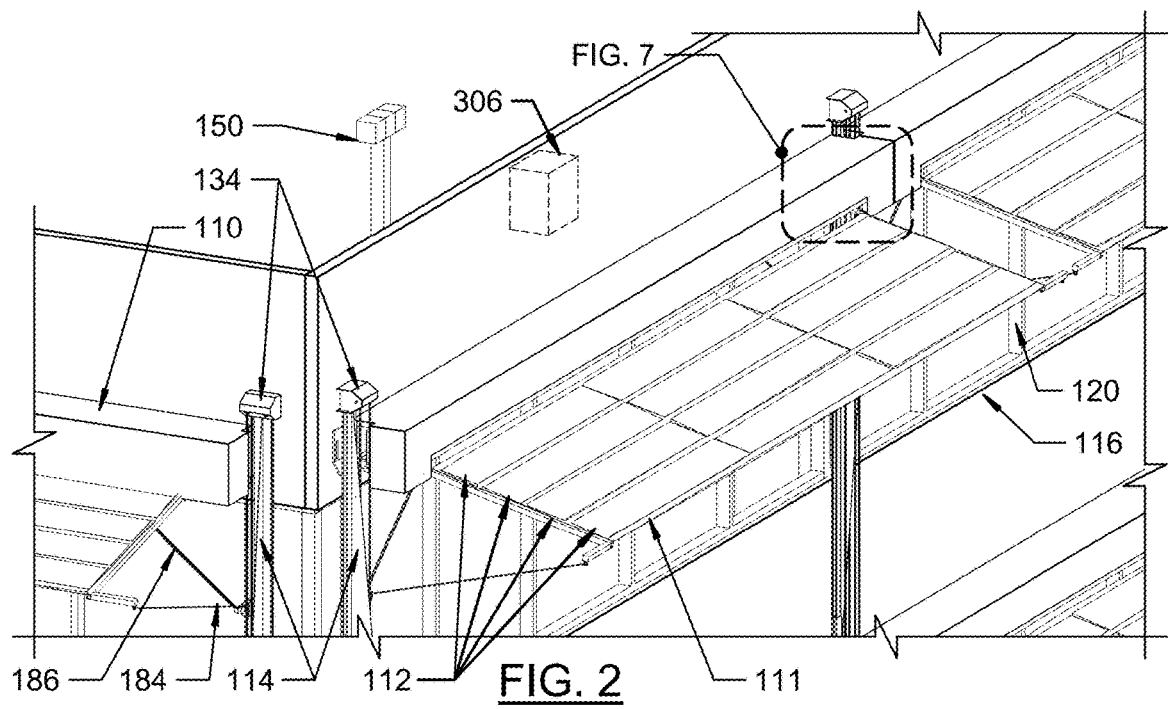
FIG. 2 is a partial, magnified isometric view of the top corner of the embodiment as shown in FIG. 1, with segments 112 being fully extended.

The automated panel system 102 is described in more detail with reference to embodiments shown in FIGS. 1, 2, and 3. Referring to the embodiment shown in FIG. 1 there is shown a building 100 on which an automated panel guidance and deployment system 102 (hereinafter automated panel system) is installed. The Building 100 may be a commercial, institutional, educational, residential, government facility or the like. Referring additionally now to FIGS. 2 and 3 for clarity, each side of the building, for example right side 104a, and left side 104b, has installed thereupon an assembly 106 of panel units 110. The panel units 110 deploy panels 111, each composed of segments 112. The panel units 110 are arranged in panel sections 108. On left side 104b, panel sections 108a, 108b, 108c, and 108d are shown. Each panel section 108 contains a panel unit 110 at each floor level, disposed between parallel guide rails 114 coupled to building walls 116.

A system controller 302 is capable of causing the panel unit 110 to move relative to the building wall 116. The panel units 110 are capable of moving along the guide rails 114, for instance, so that they can be moved to be placed over the building's windows 120 or other appropriate surfaces. In the embodiment shown in FIG. 1 the parallel guide rails 114 are disposed vertically, so the panel units 110 are capable of moving up and down the side of the building walls 116 to be conveniently placed at the top of each floor level, above each set of building windows 120. The system controller 302 is also capable of causing the panels 111 to extend and contract from the panel units 110, thus moving outward and inward relative to the building wall 116). The panels 111 are herein deemed "active" in the sense that they generate energy from such as photo-voltaic cells, or other types of renewable or non-renewable energy as may be appropriate for the building 100. The movable aspect of the panels 111 aids in maximizing energy performance enhancement that can be provided at any given time of day, depending on the active technology being used. In FIG. 1, the panels 111 of panel units 110 in the two corner sections 108a and 108d of left side 104b of building 100 are shown in their fully extended operational positions, while panels 111 of panel units 110 in the middle two sections 108b and 108c of the left side of building 100 are shown fully retracted. Two of the panel units 110 in the middle-left panel section 108b and all of the panel units 110 in the middle-right panel section 108c are shown lowered to ground level as would be the case during installation, removal or repair of the panel units 110. The other two panel units 110 in the middle-left panel section 108b are shown fully retracted but positioned above corresponding windows 120 on the building 100 as required for active use. For the panel units 110 shown at ground level, operational positions 176 are represented with dashed line type, above windows 120 at each floor level.

When in place directly above a building's windows 120, the panel units 110 can be extended to provide shading, shielding the building interior from undesirable heat gain and glare while preserving exterior views from within the building 100, even while providing necessary energy to power equipment and lighting for the building 100 and providing access for recurring maintenance required due to their active nature and exposure to the elements. Furthermore, the panels 111 can be retracted into panel units 110 for protection during harsh weather conditions that otherwise could damage components of the system 102. The motion of the panels 111 is preferably of stepped or continuous nature so as to achieve any position between fully extended and retracted. Furthermore, panel units 110 can be raised or lowered via the guide rails 114 for maintenance and repair, or other reasons.

Now further described are the structure and operation of the following:
 (1) guide rails 114;
 (2) panel units 110;
 (3) panels 111;
 (4) control system 300.
 (1) Guide Rails Referring to FIGS. 2 and 4, panel section 108 of panel units 110 is shown disposed between parallel guide rails 114. For convenience of description, panel section 108 and guide rails 114 are shown vertically disposed against building wall 116, and will be described as such with regard to embodiments shown herein, though it is understood that any directional disposition of the parallel guide rails 114 can be implemented in alternative embodiments. Panel units 110 are installed onto guide rails 114 and conveyed along guide rails 114 to be disposed where needed adjacent to building wall 116, one at each floor level 132a, 132b, 132c and 132d (FIG. 4).

The components that compose a guide rail 114 are described in more detail with reference to example embodiments shown in FIGS. 5, 6, 7, and 8. In these FIGs. a guide rail 114 is seen to include the following: A rigid member that extends along the height of building wall 116), herein referred to as a fin 126; channels 128a, 128b running along either side of fin 126; support plates 130 for anchoring the panel units 110 to building walls 116 at each building floor level 132; upper pulley element 134 for locating at one terminus of the guide rail 114, which in this embodiment is shown near the top of building wall 116 (FIG. 2), lower pulley element 136 for locating at the opposite terminus of the guide rail 114 from upper pulley element 134, which in this embodiment is shown near the bottom of building wall 116; (FIG. 6), and cable loops 138a, 138b (separately referred to as cable loop 138) extending between upper pulley element 134 and lower pulley element 136; and motorized energy unit 118 (to be described later).

Figure 5:
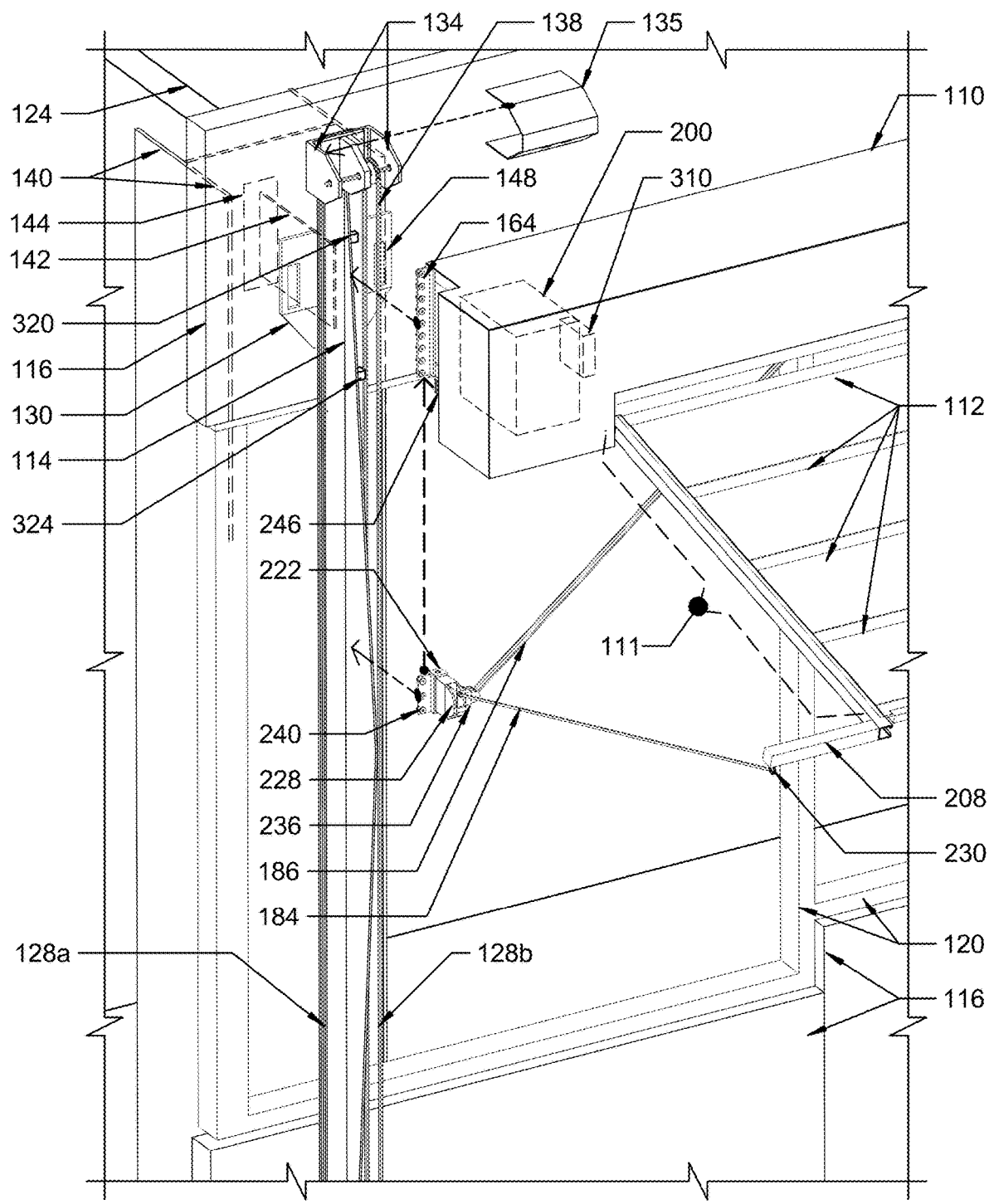
FIG. 5 is an exploded isometric view at the top of guide rail 114 for the embodiment as shown in FIGS. 1 and 2, with connection to column 140 (dashed lines) at one end of panel unit 110.

Each guide rail 114 is attached through the building wall 116 to column 140 via structural connectors, for example steel support plates 130 (FIGS. 5, 6, 7 and 8) and structural plate 142 and connection plate 144 (FIGS. 5 and 6). In FIG. 6, a mounting plate 146 is shown behind lower pulley element 136, disposed against building wall 116. A structural plate 142, made of steel or other strong supportive building grade material, extends through building wall 116 and is welded, bolted, or the like, to a column 140 that is part of the building structure. Alternatively depending upon configuration of the building 100, the support plate 130 may instead be connected to a beam that is part of the building structure. The support plate 130 is welded, bolted, or the like, to the structural plate 142 that extends through the wall. The lower pulley element 136 is, in turn, welded or bolted, or the like, to the mounting plate 146. The upper pulley element 134 is attached to the building wall 116 by the uppermost support plate 130 near the top of the wall 116.

Figure 7:
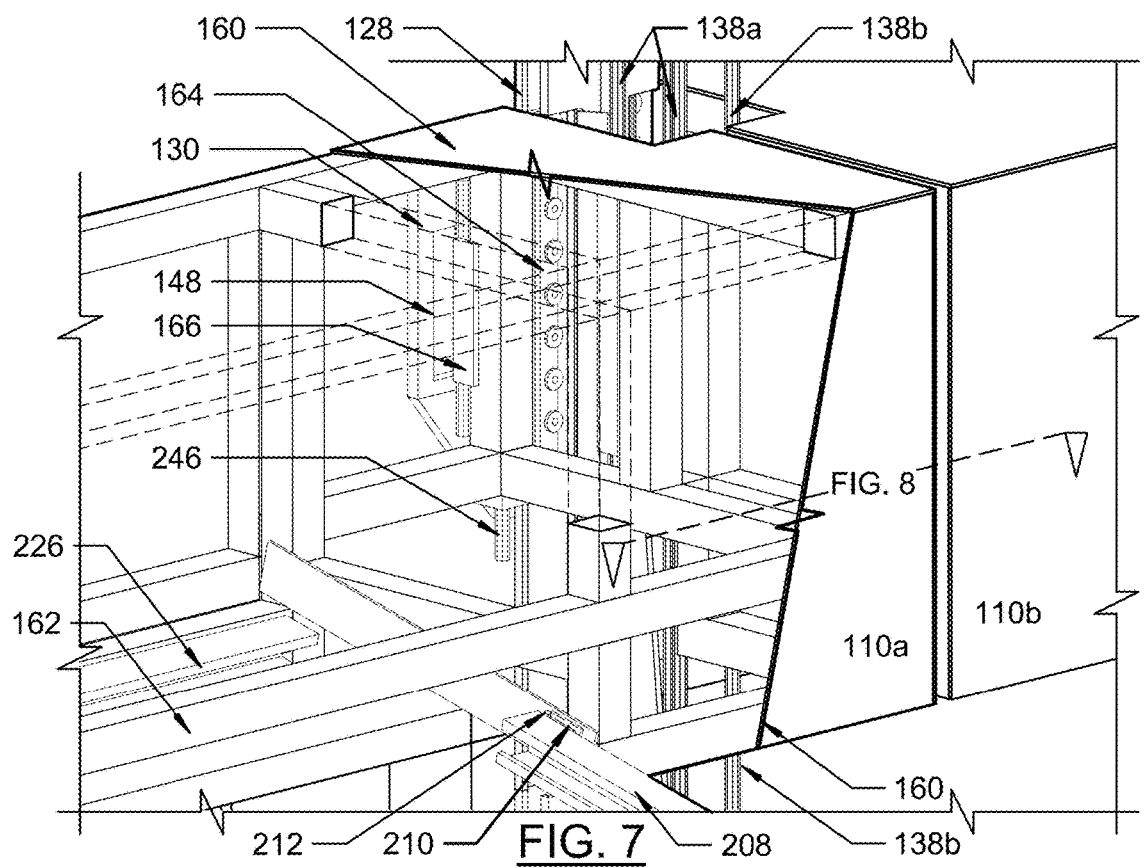
FIG. 7 is a partial cut-away isometric view of the embodiment as shown in FIG. 2, with housing 160 of panel unit 110a partially removed to reveal elements that would secure the panel unit at support plate 130 and a portion of channel 128 removed to show elements that connect it with the panel unit.

In FIG. 7, another support plate 130 is shown. At each guide rail 114, a series of such support plates 130 are attached to the building structure, one near the top of windows 120 at each building floor level by a connector inserted through the wall, as with structural plate 142 shown in FIG. 5. In a similar manner to the mounting plate 146 that attaches the lower pulley element 136, these support plates 130 are preferably steel or of other appropriate building structural material, and are attached to a solid support extension member structural plate 142, attached to the building structure column 140 in the same manner as described above with regard to mounting plate 146, via an extension member connection plate 144 coupled to column 140 via welding, bolting, or the like. The support plates 130 further contain receiving slots 148 which are used for installing and securing panel units 110, as will be further described. Support plates 130 can be used as mounting plates 146 for part reduction and/or cost savings.

Figure 8:
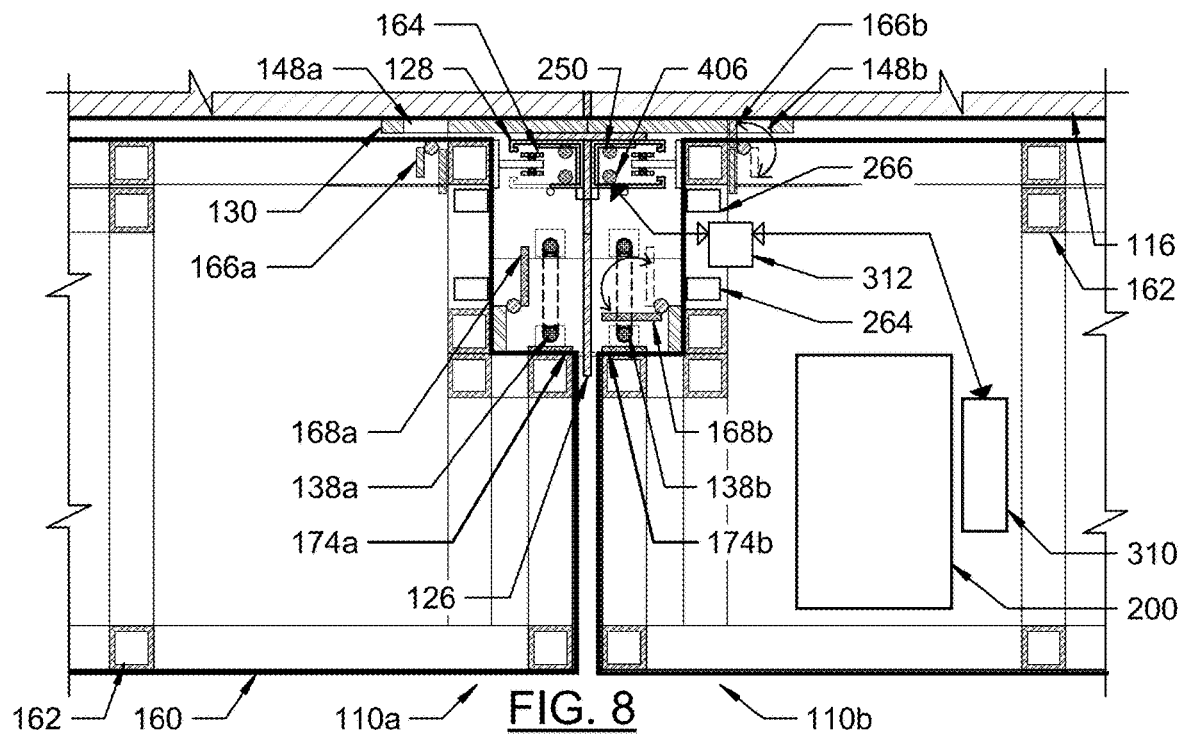
FIG. 8 is a partial plan view of the embodiment as shown in FIG. 7, with support elements of panel unit 110a disengaged and support elements of panel unit 110b engaged, along with unit motor 200.

Referring now to FIGS. 5, 6 and 8, the fin 126 provides rigid stability to the guide rail 114. The fin 126 is preferably produced of steel or of other appropriate building structural material, as conditions require. In the embodiments shown, the fin 126 is shown to taper inwards at floor levels. This design can save weight while maximizing strength in some applications. Other embodiments might incorporate different types of lightweight structural members, such as typically produced steel shapes, aluminum, zinc, carbon fiber or coated members that have other desirable properties, such as resistance to corrosion, heat conductivity or galvanic action. Referring to FIG. 6, the fin 126 is shown, on part of building wall 116, to be attached to a mounting plate 146. In this embodiment, fin 126 has T-shaped extensions along its length that mate with support plates 130. Fin 126 is welded, bolted, or the like to each support plate 130 along the length of rail guide 114. Fin 126 may also be welded, bolted, or the like to support plates 130 and 146 behind pulley elements 134 and 136, as applications require.

Also shown in FIGS. 5, 6, 7, and 8 are channels 128a, 128b and individually referred to as a channel 128. The channels 128 are disposed on each side of fin 126 in oppositely opposing position, as is clearly seen from the top view in FIG. 8. The channels are generally "C" shaped and configured to aid in installation and movement of the panel units 110, as will be further described. The channels 128 may be of various types of construction suitable for the particular building requirements, including but not limited to steel, aluminum, various plastics, PVC, carbon fiber, and the like.

Referring now to FIGS. 5, 6, 7, and 8, cable loops 138a and 138b are shown extending between upper pulley element 134 and lower pulley element 136. Each cable loop 138 is associated with one side of the fin 126, and, during operation, is instrumental in the movement of one side of a panel unit 110, as will be further described. A cable loop 138 may be of various types of construction suitable for the particular building need, including but not limited to a metal or plastic chain loop, a metal cable such as a steel or composite metal cable, a rubber loop, or a PVC or composite plastic material loop, or the like.

(2) Panel Units

Referring back to FIG. 1, the panel section 108 shows a group of panel units 110, one at each building floor level, each panel unit 110 mounted between parallel guide rails 114. Panel units 110 are shown extended in the operational position 180 in panel sections 108a and 108d on the left side of the building and at all panel sections on the right side of the building. Panel units 110 are shown retracted in the inactive position 182 in panel sections 108b and 108c, some being at inactive locations 170 and some at operational locations 176.

In FIG. 2, panel units 110 are shown supported on guide rails 114, with panels 111 shown extended, supported on back strut 186 and side support 184 and comprised of multiple segments 112.

In FIG. 4, a panel section 108 is shown in more detail. Panel units 110a, b, c and d are mounted at successive floor levels 132a, b, c and d above windows 120, between guide rails 114a and 114b, with panels 111 shown in an extended, operational position 180.

The construction of the panel units 110 with regard to how they engage with the guide rails 114 is now described with reference to FIGS. 5, 6, 7 and 8.

FIG. 5 is an exploded view, showing one end of a panel unit 111 in front of the guide rail 114 and cable loop 138 that support it. Guide rollers 164 at each end of the panel unit 110 are mounted on each inside corner of the panel unit, positioned in location as indicated by the dashed arrow, engaging with channels 128 at the guide rails 114, as will be described further in FIGS. 7 and 8.

The end of panel 111 is shown in the extended, operational position and is made up of several segments 112 supported at their ends by extension rail 208, which is anchored at the lead end 230 to side support 184, which connects to vertical runner 240 at the base end 228. The vertical runner is also connected to back strut 186 by the lower fitting 222 with ball joint 236.

When the panel unit is mounted on guide rails 114, the vertical runner is secured within the channel 128b at the location indicated by the dashed arrow. When the panel 111 is retracted, the vertical runner moves vertically upward as shown by the vertical dashed arrow, until it nests within the base of the panel unit 110 above, on peg mount 246.

Referring to FIG. 6 and with reference to FIG. 1, installation of a panel unit 110 is described as follows. In FIG. 1, some panel units 110 in panel sections 108b and 108c are shown at inactive locations 170, where they are to be installed and removed as needed. In FIG. 6, the base of a guide rail 114 is shown. It can be seen that each channel 128 includes a hinged door 172 within it, occurring on both ends of each inactive location 170.

In FIG. 6, Section 1, the two panel units 110a and 110b and guide rollers 164a and 164b are shown as dashed lines in a view from above with door 172a at the left channel 128a in the open position. The left panel unit 110a is shown being installed, indicated by dashed arrows toward the building wall 116.

As the left panel unit 110a moves toward the building wall 116, the guide roller 164a is received into the channel 128a via the open hinged door 172a.

While the panel unit 110 is being installed in the retracted, inactive position 182, the vertical runner 240 as shown in FIG. 5 and FIG. 7, is nested on peg mount 246 at the base of the panel unit, aligned directly below guide roller 164 and is simultaneously also received into the channel 128a).

At the right panel unit 110b, the hinged door 172b is shown closed as indicated by the curved arrow, securing the guide roller 164*b* within the channel 128*b*, the right panel unit 110*b* now being ready to move to an active location.

Referring to FIGS. 7 and 8, there are shown two panel units 110 coupled to either side of a guide rail 114. In the embodiment, the panel unit 110 is shown to include a unit housing 160 covering a unit frame 162. Portions of the unit housing 160 and unit frame 162 are cut away in this figure and shown as dashed lines, to reveal internal details where unit components connect to the guide rail 114. The unit housing 160 may be of plastic, aluminum, steel, or other metal as building conditions require. The unit frame 162 is of tubular metal, plastic, or PVC construction as is convenient. The unit housing 160 is constructed to hold within it the panel, with hinged segments folded, as will be further described below.

Guide rollers 164 mounted on each inside corner of the panel unit are herein embodied as a roller mount assembly that engages both interior edges of the continuous opening along channel 110. The rollers may be of metal, rubber, or other convenient construction, and may vary in number as is convenient.

The panel unit 110 further includes a support latch 166 on each end for engaging with the receiving slot 148 on the support plate 130 at each guide rail 114, in order to anchor the panel unit in its designated operational location 176 (FIG. 1) on the building wall 116. The panel unit 110 further includes a cable clamp 168 at each end for engaging the cable loops 138 for conveyance of the panel unit 110 for installation, maintenance and removal.

In FIG. 8, the two panel units 110*a* and 110*b* of FIG. 7 are shown installed, in a plan view from above. The right panel unit 110*b* is engaged with cable clamp 168*b* for conveyance as will be described. The cable clamp 168*a* at the left panel unit 110*a* is in the open position. The cable clamp is embodied as a hinged and textured plate-like structure, that when activated, closes to grasp the outer leg farther from the building wall of the cable loop 138*a* between itself and friction plate 174*a* of the panel unit 110*a*. The panel unit is then ready to be lifted or lowered according to commands from the panel section controller 306.

Once a panel unit 110 has been raised on the cable loop 138 to its operational location (176 as shown in FIG. 1), unit support latches 166 at each end of the panel unit 110 are activated, each latch pivoting on its hinge to engage with the receiving slot 148 in the unit support plate 130. Cable clamps 168 at each end of the panel unit then release the cable loop 138.

In an embodiment, the cable clamp 168 is configured such that the weight of the panel unit 110 when applied to the cable loop 138 will act to increase the grasping pressure of the cable clamp 168 on the cable loop 138. Based upon this same principle, the cable clamp 168 will only release the cable loop 138 when the weight of the panel unit 110 is no longer bearing upon the cable loop 138.

In FIG. 9, portions of Panel Units are shown in greater detail, expanding on information as identified on FIG. 4.

In FIG. 9 as in FIG. 5, the panel 111 is shown in the extended, operational position, supported along the side edge by extension rail 208, which is anchored to side support 184, which connects to the vertical runner 240 at the base end 228. The vertical runner is secured within the channel 128 and connected to back strut 186 by the lower fitting 222 with ball joint 236. The back strut 186 is connected by upper fitting 220 to the horizontal runner 242.

In FIG. 9, Section 1, segments 112 are shown unfolded and extended from the unit enclosure and supported by extension rail 208 at each end, movably mounted in the containment channel 192 by panel rollers 190 connected to corners of the segment frames. For illustrative purposes, segments 112' are also shown (dashed lines) in the folded position within the unit enclosure 160, (3) Panels Referring to the embodiment shown in FIG. 1, each building side 104 has installed thereupon an assembly 106 of panel units 110. Extending from panel units 110 are panels 111, each composed of segments 112. The panels 111 are capable, via automation to be further described, of moving in various directions relative to the building walls upon which they are placed. The panels 111 are preferably "programmable" or "responsive", adjustable in position, location and mode according to commands received from control system 300, integrated with an energy management control system 342 to provide functionality coordinated with other mechanical and electrical building systems, in order to optimize energy performance of the building as a whole and comfort of the occupants.

The movable aspect of the panel units aids in maximizing percentage yield of solar energy converted to electricity. It also allows for variable shielding of the building interior from excess solar heat gain as well as daylight glare, with optimal positioning to meet changing needs according to season, time of day and local weather conditions, as identified and directed by the energy management control system 342.

In FIG. 1, the panels 111 of panel units 110 in the end sections 108*a* and 108*d* of the left side 104*b* of building 100 are shown in their fully extended operational positions, while panels 111 in panel units 110 of the two middle sections 108*b* and 108*c* of the left side of building 100 are shown fully retracted.

In FIG. 2, the panels of FIG. 1 are shown in greater detail. Segments 112 of the panel are shown unfolded in the operational position, extended fully from panel unit 110. Side support 184 and Back strut 186 are visible as supporting the extended segments 112.

In FIG. 4, panels 111 are shown in the operational position at each of the panel units 110*a, b, c* and *d*. In FIG. 4 Section 1 the panels 111 extend outward from the building wall 116, held by side support 184 at each of the panel units 110, supported by guide rails 114.

In FIG. 4, panel 111 as shown in FIG. 4 is here shown in greater detail, held by side support 184, with angle adjusted dashed arrows according to variable positioning of the back strut 186 and vertical runner 240.

In FIG. 9 Section 1, panel 111 as shown in FIG. 4 Section 1 is here shown in the extended position in greater detail, being comprised of several segments 112. It is further shown in the retracted inactive position (dashed lines), comprised of several folded segments 112', within the unit housing 160.

Extending Panel

Figure 10:
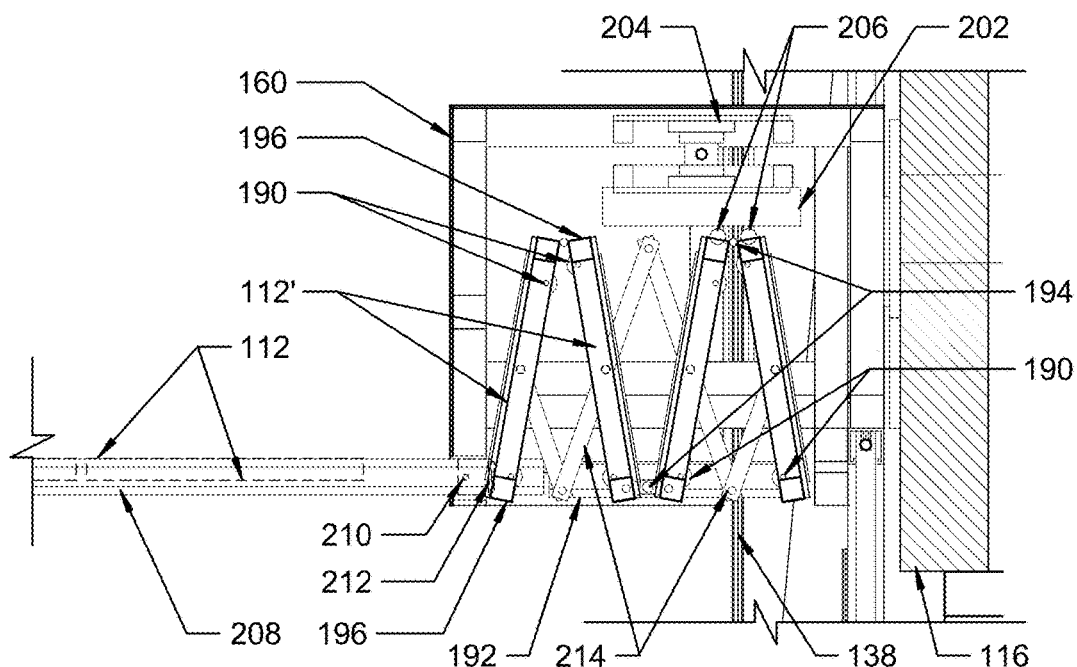
FIG. 10 is a partial section cut view of the embodiment as shown in FIG. 9, Section 1, with panel segments 112' shown folded inside unit housing 160 and further enlarged to illustrate a greater level of detail within the panel unit.

The process of extending panels 111 is described with reference to FIGS. 9, 10, and 11. In the embodiment, a panel 111 is composed of multiple segments 112 that extend and retract from within the panel unit 110. Each segment 112 is given strength by a segment frame 196 composed of tubular aluminum elements or the like that are welded, bolted or otherwise structurally connected to one another to form a rigid frame. Spring hinges 194 attached securely to the segment frames 196 link the individual segments 112 together and default to the closed, folded position within the panel unit 110. Advantageously, in the event of a power failure at one or more units, they will automatically retract to inactive position 182. Panel rollers 190 at the far ends of each panel are held by a containment channel 192 within the unit housing 160 when in the folded or closed position.

The unit motor 200 (FIG. 8 and FIG. 9) operates to push the folded segments 112 out of the panel unit 110, causing them to open and form the panel 111 as follows. To open the panel 111, press bars 202 located above the segments 112 at each end of the panel unit 110 and at several intermediate lengthwise positions within the panel unit 110 push downward on the top edge bearing points 206, comprised of roller inserts at points that align with press bars above along the two innermost folded segments 112 (FIG. 9 Section 1 and FIG. 10). Inside the top of the panel unit 110, the press bars 202 are connected at each end to scissor mounts 204 above the folded, hinged segments 112. The unit motor 200 turns the extension rod 234, opening the scissor mounts 204 at each end of the panel unit 110. As the scissor mounts 204 move the press bars 202 downward, they come into contact with the top edge bearing points 206 of the two inner segments 112, causing them to unfold and in conjunction with the scissor extender 214, cause the two outer segments to unfold. As this occurs, the bottom, outer edge of the outermost segment 112 pushes horizontally outward on the extension rails 208 that are folded inside the panel unit 110, causing them to rotate outward horizontally on hinge mounts 212, away from the building wall 116, until they reach full extension as shown in FIG. 11. The segments 112 then continue unfolding and rolling out along the extension rails 208 until they form the fully extended panel 111.

The panels 111 when extended are adjustable in angle position, where the extension rails 208 that support the panel 111 when unfolded, each rotate on a pivot mount 210 (FIGS. 7, 10 and 11) at their inside ends. The pivot mounts have a default position where the extension rails 208 tilt slightly above horizontal, back towards the building.

The unit motor 200 adjusts the angle of the panel 111 downward as follows: The unit motor 200 moves the upper fitting 220 of back strut 186 towards the adjacent guide rail 114 by rotating the strut rod 232 (FIG. 9 Section 1 and FIG. 10) that runs through the back rail 224 (FIG. 9 Section 1, FIGS. 10 and 11). This moves horizontal runners 242 that are threaded onto the strut rod 232 and movably secured within the back rail 224, causing them to move along the length of the strut rod, toward the guide rails 114 at either end.

Mounted to each horizontal runner, the upper fitting 220 of each back strut 186 moves the inner end of the back strut horizontally along the back rail, thereby causing the lower fitting 222 of each back strut 186 to move downward, attached to and guided by the vertical runner 240 which is mounted in the channel 128.

Figure 11:
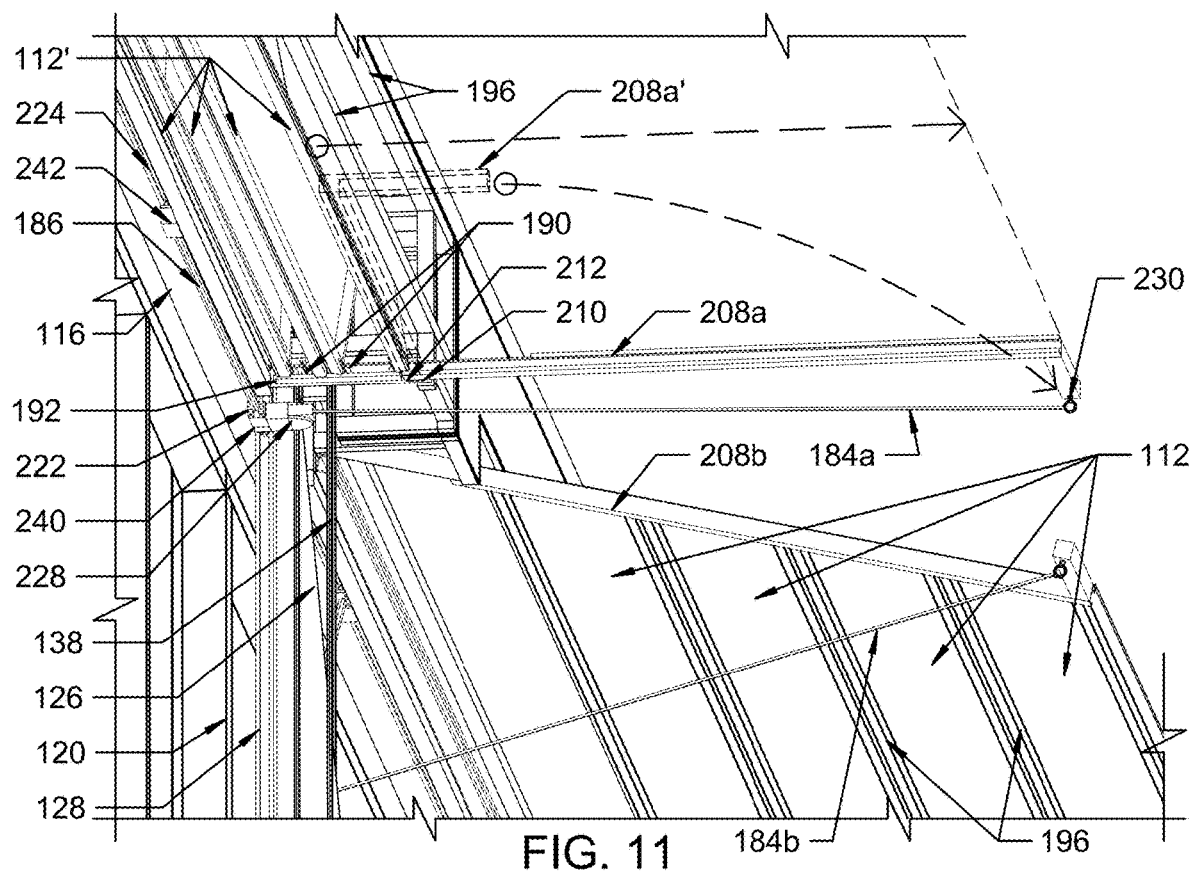
FIG. 11 is a partial isometric view of the embodiment as shown in FIG. 4, seen from below the panel units, where segments 112 at one are shown fully extended and segments 112' at the other are shown within the panel unit, with extension rail 208a deployed as segments 112' begin to unfold and extension rail 208a' (dashed lines) showing position prior to rotating outward from the unit housing 160.

As the vertical runner 240 attached to the lower fitting 222 of the back strut 186 moves downward in the channel 128, it pulls down on the base end 228 of side support 184, causing the panel 111 to tilt further downward, rotating on pivot mount 210 (FIG. 11). As the fully extended panel 111 reaches the assigned angle for the operational position 180, the unit motor 200 stops. This operation can then also be reversed, adjusting the panel 111 upward to optimize the angle of the operational position, as directed by commands from the unit controller 310.

Retracting Panel

Referring again to FIG. 11, The pivot mount 210 of the extension rail 208 is spring actuated with a default position that returns the extension rails 208 from the angled orientation when the panel 111 is in the operational position 180, back to a position slightly above horizontal, as it remains projecting outward from the building wall 116 before folding back into the unit housing 160.

In this sequence, the unit motor 200 mounted within one end of the unit frame 162 (FIGS. 8 and 9) receives Direct Digital Control (DDC) commands from the unit controller 310 also mounted within the unit frame 162, instructing it to turn the strut rod 232, which is mounted parallel to and within the back rail 224 (FIG. 9 Section 1 and FIG. 10), in the opposite direction from that required to tilt the panel 111 downward as indicated under the description for 'Extending Panel' provided above.

Each horizontal runner 242 is connected to the upper fitting 220 of the back strut 186, and moves the inner end of the back strut horizontally along the back rail away from the adjacent channel 128, thereby causing the lower fitting 222 of each back strut 186 to move upward, until it returns to its closed position, nesting onto peg mount 246 (FIGS. 5 and 7) recessed under the back corner of the panel unit 110.

The lower fitting 222 being attached to and guided by vertical runner 240 mounted in channel 128, moves the base end 228 of side support 184 upwards in channel 128, releasing the tension on side supports 184. The panel 111 rotates upward on the spring actuated pivot mounts 210 until it reaches a position slightly beyond horizontal, angled back towards the unit housing 160. The panel 111 then slides back on the panel rollers 190 towards the interior of the unit housing 160. With the extension rails 208 at either side of the panel 111 now being aligned again with the containment channels 192 (FIG. 9 Section 1 and FIG. 10) mounted inside each end of the unit housing 160, the panel 111 continues rolling until it reaches the inner end of the containment channels, closest to the building wall 116.

The containment channels 192 being partially open along their top edge, as folding segments 112 reach this point within the panel unit 110, the panel rollers 190 mounted on the upper hinged edges of the segments are then free to move upward and begin to fold again, due to the force applied by the spring hinges 194 connecting them. The segments fold back upward into the unit housing 160, until they again come into contact with the press bar 202 above, which is in a lowered position.

As the top edge bearing points 206 of the segments 112 come into contact with the press bar 202, the extension position sensor 372 on the scissor mount sends data to the unit controller 310, which sends a command to the unit motor 200 to rotate the extension rod 234, slowly retracting the scissor mounts 204 at each end of the press bar 202, allowing the hinged segments 112 to fold back into the unit housing 160.

(4) Control System

Figure 12:
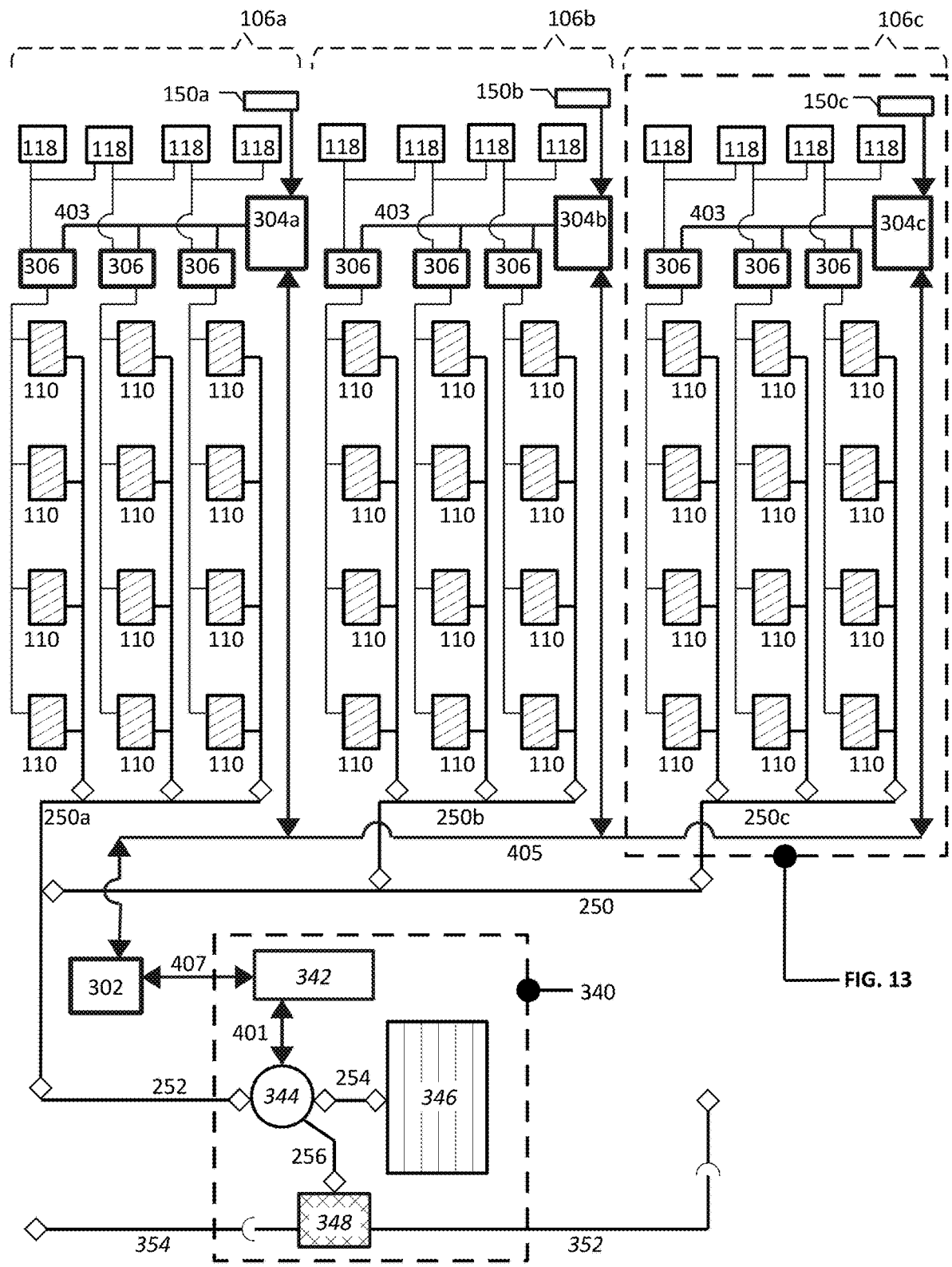
FIG. 12 is a high level block diagram showing control system 300 for the embodiment as shown in FIGS. 1, 2, 3 and 4 of the automated panel guidance and deployment system 102.

In FIG. 12, there is shown a building energy management and storage system 340. This includes components found in many buildings, including a building energy management control system 342 or EMCS. The EMCS 342 is coupled to a power flow switch 344. The power flow switch 344 is coupled to a battery array 346 and to an electric current inverter 348. The EMCS 342 provides signal information 401 that indicates that power should flow either to the battery array 346 or to the inverter 348. From the inverter 348, power flows to serve building power requirements via 352, and/or as surplus power to the utility grid via 354.

The EMCS 342, while executing its usual building power maintenance and control functions, is additionally coupled to the system controller 302. The EMCS 342 and system controller 302 communicate via 407 as will be further described. Information provided by system controller 302 is used by EMCS 342 to control the power flow switch 344 to control the provision of power generated by panels 110 via power line 252, and to feed information back to the system controller 302 to aid in control of components of the automated panel system 102 as will be further described.

The automated panel system 102 that feeds the power flow switch 344 and system controller 302 is shown in block diagram form in FIG. 12. In the embodiment shown, and referring to FIG. 12, three assemblies 106 are shown, each including three panel sections 108. Each panel section 108 includes four panel units 110, each panel unit deploying a panel 111. The system controller 302 is coupled to assembly controllers 304a, b and c. There is an assembly controller 304 associated with each assembly 106a, b and c. The assembly controllers 304 are in turn coupled to panel section controllers 306. There is a panel section controller 306 associated with each panel section 108 and coupled to unit controllers 310, one for each panel unit 110 in the panel section 108. Each panel section controller 306 is also coupled to a motorized energy unit 118. Each assembly 106 also includes an elevation sensor post 150 coupled to the assembly controller 304.

Figure 13:
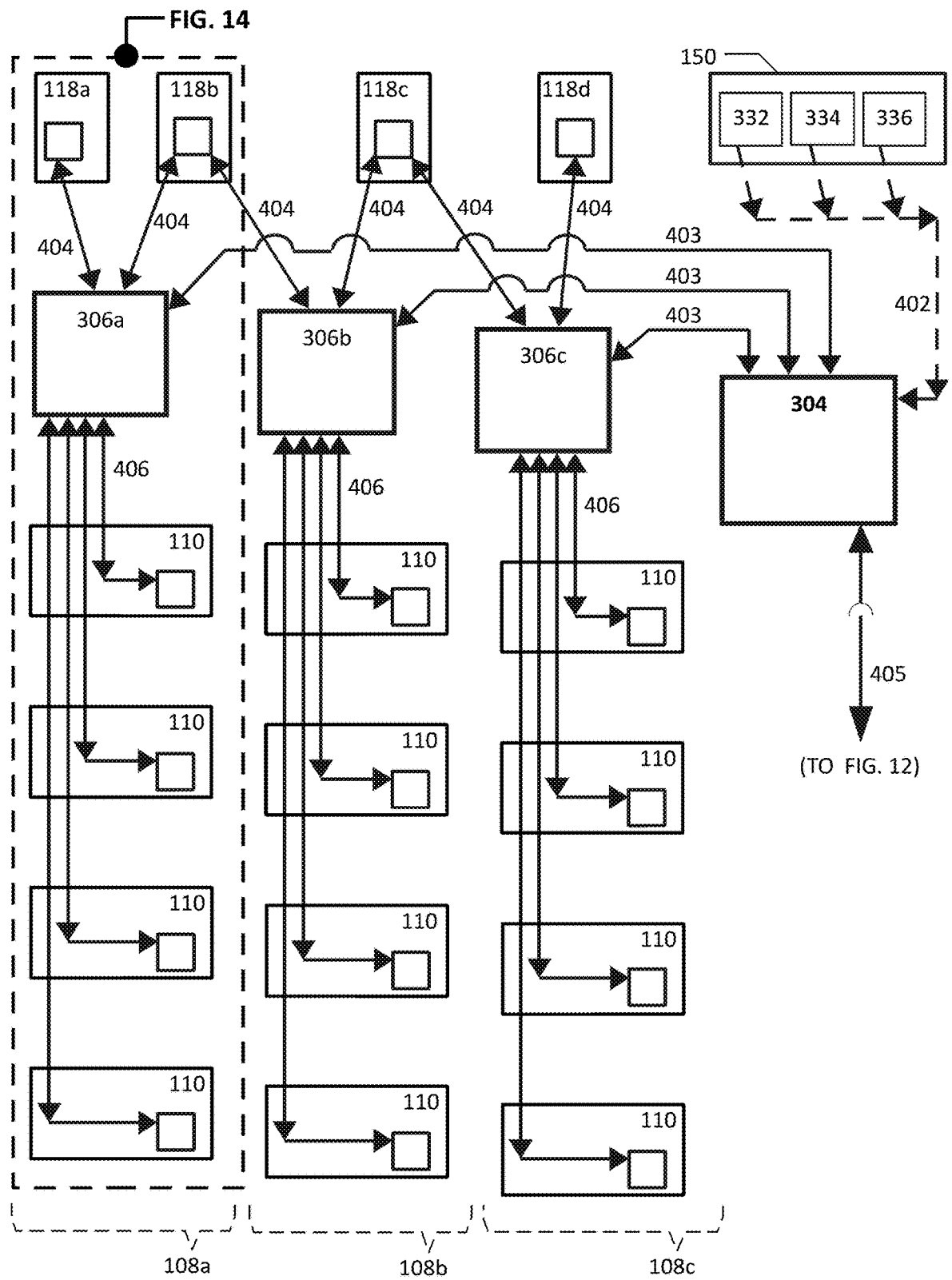
FIG. 13 is a block diagram showing controls for an embodiment of assembly 106, similar to that shown in FIGS. 3, 4, 5 and 6 and describing further detail of the area identified in FIG. 12.

The assembly controller portion 304 of FIG. 12 is shown in more detail in FIG. 13. The assembly controller 304 is shown coupled to panel section controllers 306a, b and c via 403. Each panel section controller 306 is coupled to its respective panel units 110 and panels 111 in its panel section via 406. Each panel section controller 306 is in turn coupled to a pair of motorized energy units 118 via 404. In this embodiment, each section includes a motorized energy unit at each end, though embodiments implementing one motorized energy unit are contemplated. The elevation sensor post 150 is shown to include sensors for air temperature 332, barometric pressure 334 and wind speed 336. Data from these sensors is transmitted via 402 to the assembly controller 304, which incorporates the information into calculations, analyzing local micro-climate conditions, then sends corresponding commands to panel section controllers 306 to aid in adjusting positions of the corresponding panel sections 108.

Figure 14:
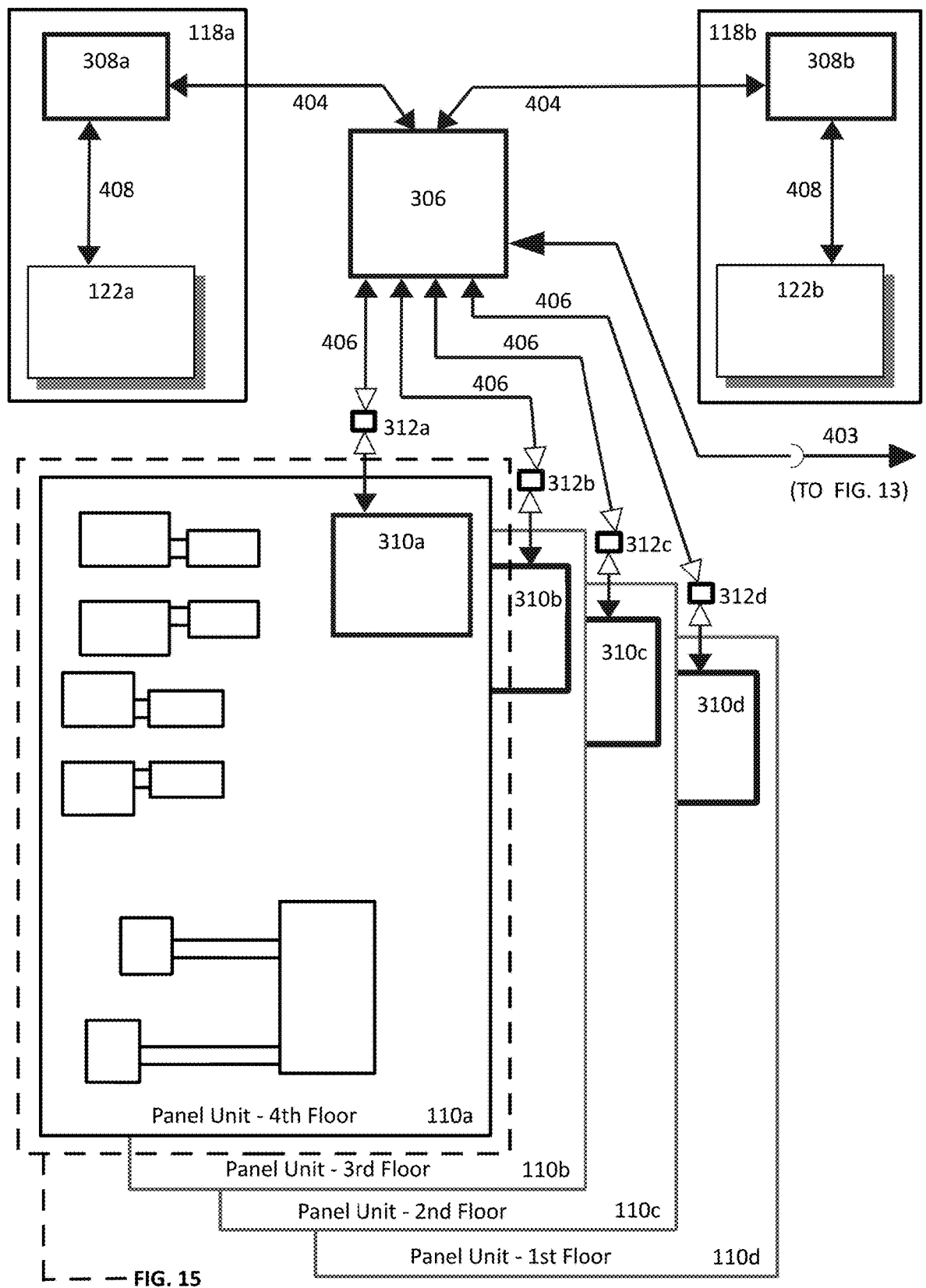
FIG. 14 is a block diagram showing controls for an embodiment of panel section 108, as shown in FIGS. 4, 5 and 6 and describing further detail of the area identified in FIG. 13.

One panel section 108 of FIG. 13 is shown in more detail in FIG. 14. The panel section controller 306 is shown connected to a pair of motorized energy units 118a and 118b. Each motorized energy unit is shown to include a drive controller 308a and 308b, coupled to energy unit motors 122a and 122b via connection 408. The panel section controller 306 is also shown coupled via connection points 312a, b, c and d to the unit controller 310 in each panel unit 110 in the panel section 108, the connection points allowing individual panel units 110 to be readily installed or removed from the control system as necessary for repair, maintenance or replacement.

Figure 15:
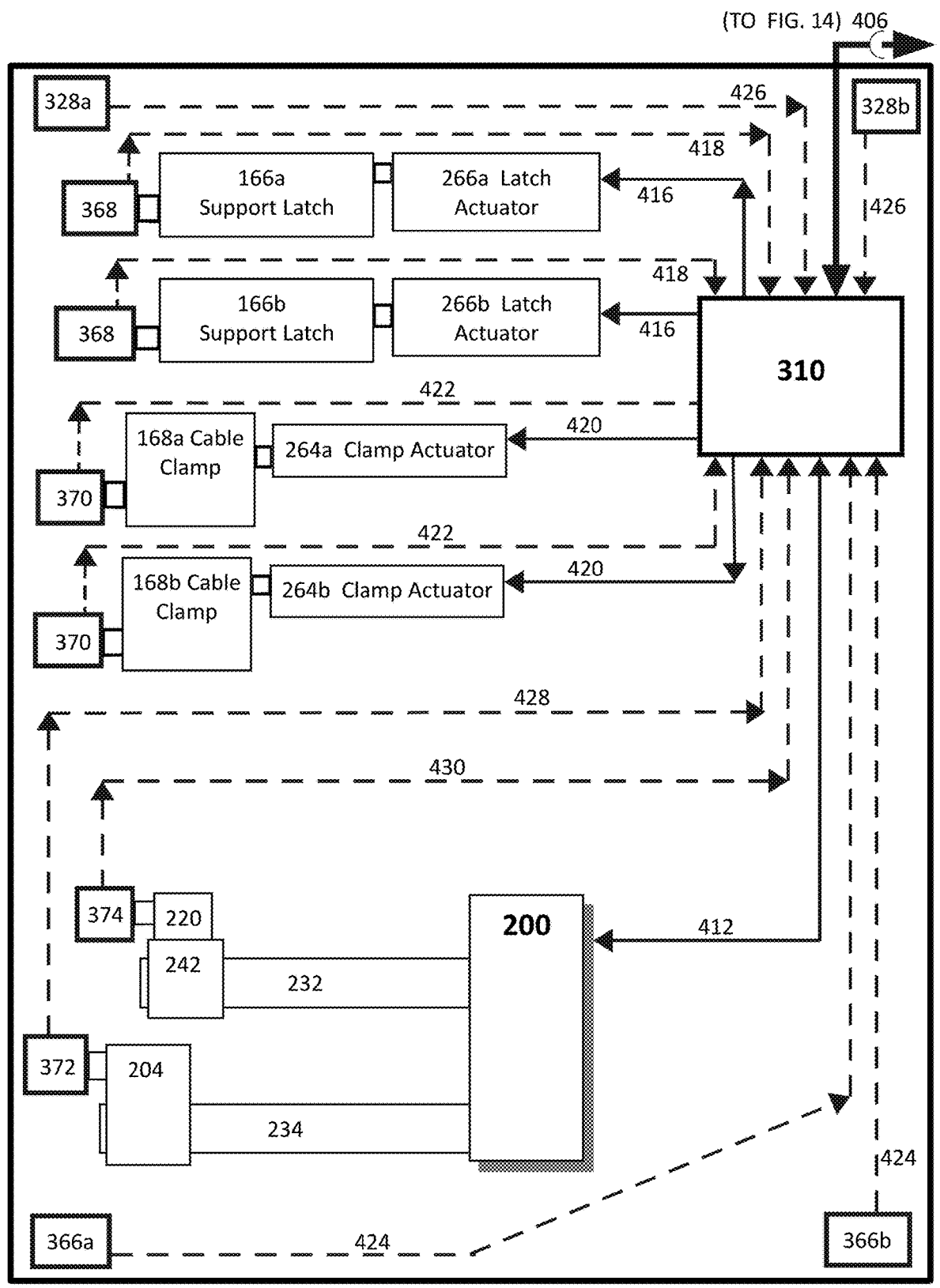
FIG. 15 is a block diagram showing controls for an embodiment of panel unit 110, as shown in FIGS. 4 through 11 and describing further detail of the area identified in FIG. 14.

The panel unit 110 portion of FIG. 14 is shown in more detail in FIG. 15. In this unit controls diagram, dashed arrows indicate feedback data paths from equipment or sensors to the unit controller 310, while solid arrows indicate commands sent from the unit controller 310 to various actuators and motors to cause action to occur. Heavy solid line arrow 406 indicates communication between the unit controller 310 and the panel assembly controller 304 of FIG. 14.

The unit controller 310 is coupled for example via Direct Digital Control (DDC) commands to a pair of latch actuators 266a and 266b, one at each end of the panel unit 110. Each unit latch actuator 266 drives the unit support latch 166. Each support latch 166a and 166b provides feedback data 418 to the unit controller 310. The feedback data 418 includes information as to whether the support latch 166 is open or closed. The unit controller 310 is also coupled to a pair of clamp actuators 264, one at each end of the panel unit 110. Each clamp actuator 264 drives the cable clamp 168. Each cable clamp 168 provides feedback data 422 to the unit controller 310. The feedback data 422 includes information as to whether the cable clamp 168 is open or closed, and information as to whether the cable clamp 168 senses weight, or downward force, being exerted on the cable clamp. The panel unit 110 is also coupled via feedback path 424 to base pressure sensors 366, one at each end of the unit, which provide feedback indicating whether the base of the panel unit is supported upon a surface below (i.e. at ground level or on top of another unit, etc.) or alternatively whether it is suspended by the cable clamps 168 on the cable loops 138 or the support latches 166 at the support plates 130 as shown in FIG. 8. The base pressure sensors may be embodied as any of various types of pressure sensors known in the art, capable of providing feedback to the unit controller 310, indicating a range of values from partial to full weight bearing. The unit controller 310 is further coupled via feedback path 426 to a pair of height location sensors 328, which provide feedback as to where the panel unit is as it traverses the height of the building. Height location sensors 328 detect various height markers installed along each guide rail 114 (FIG. 4), including near location markers 324, operational location markers 320, near removal markers 326 and inactive location markers 322, indicating whether the panel unit 110 is close to, or at its operational location 176 or its inactive location 170 as it is raised or lowered by the cable loops 138. The height location sensors 328 may be embodied in various ways known in the art, including optical sensors, RFID sensors, and the like.

The unit controller 310 is also coupled via signal 414 to a unit motor 200 that resides within the panel unit 110. The unit motor 200 drives the extension rod 234, which propels the scissor mount 204, causing the panels to extend outward or fold back into the panel enclosure. In addition, the unit motor 200 drives the strut rod 232 which propels the lower fitting 222 of the back strut 186, adjusting the angle at which the panels 111 project from the building wall 116.

Methods for control of panel units via first commands, and control of panels via second commands, are now described.

Panel Units

Figure 16:
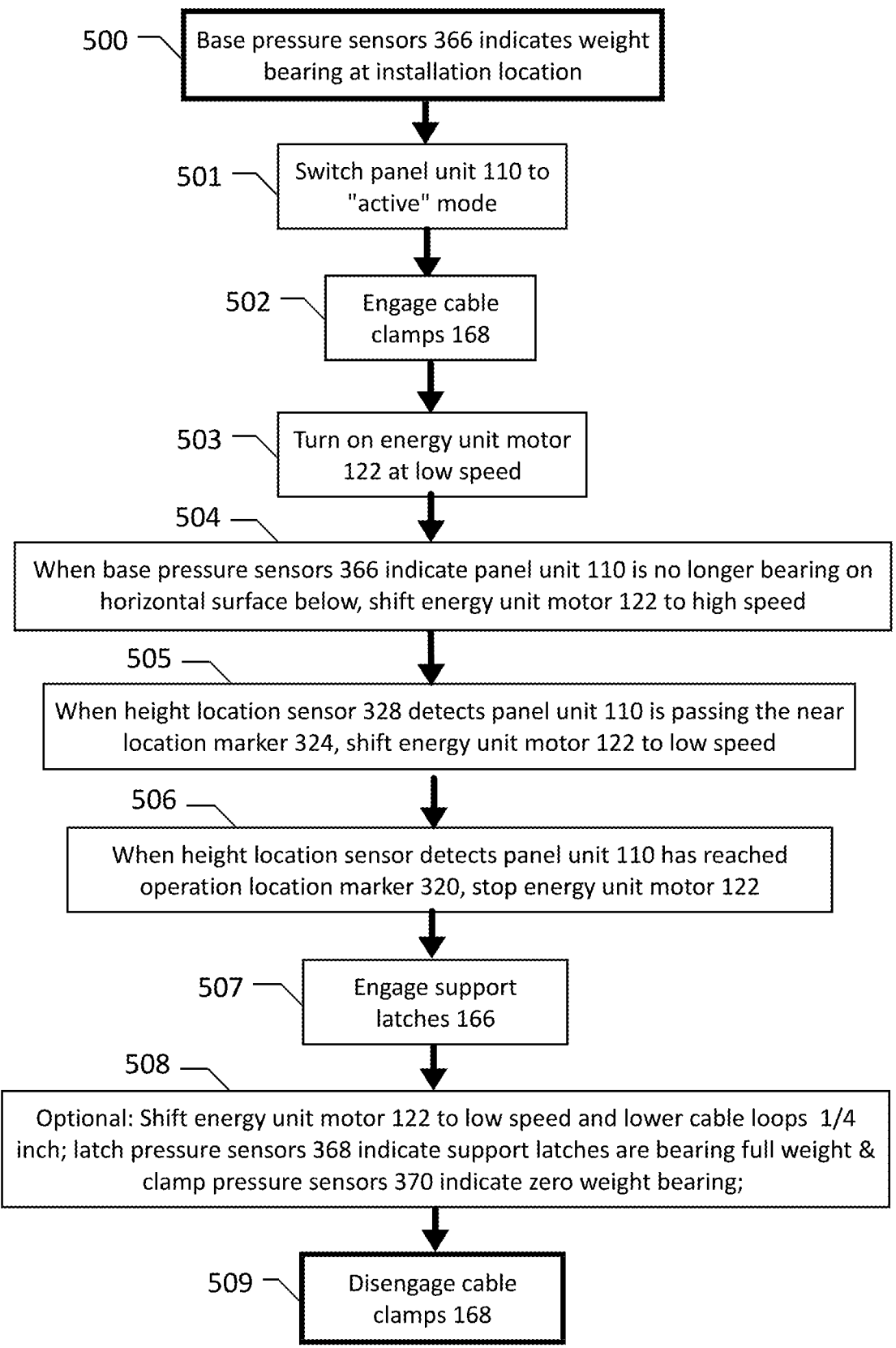
FIG. 16 is a flow diagram of the process by which the embodiment of FIGS. 1 through 11 operates to install the panel unit at the building, moving and securing it at its operational location 176.
Figure 17:
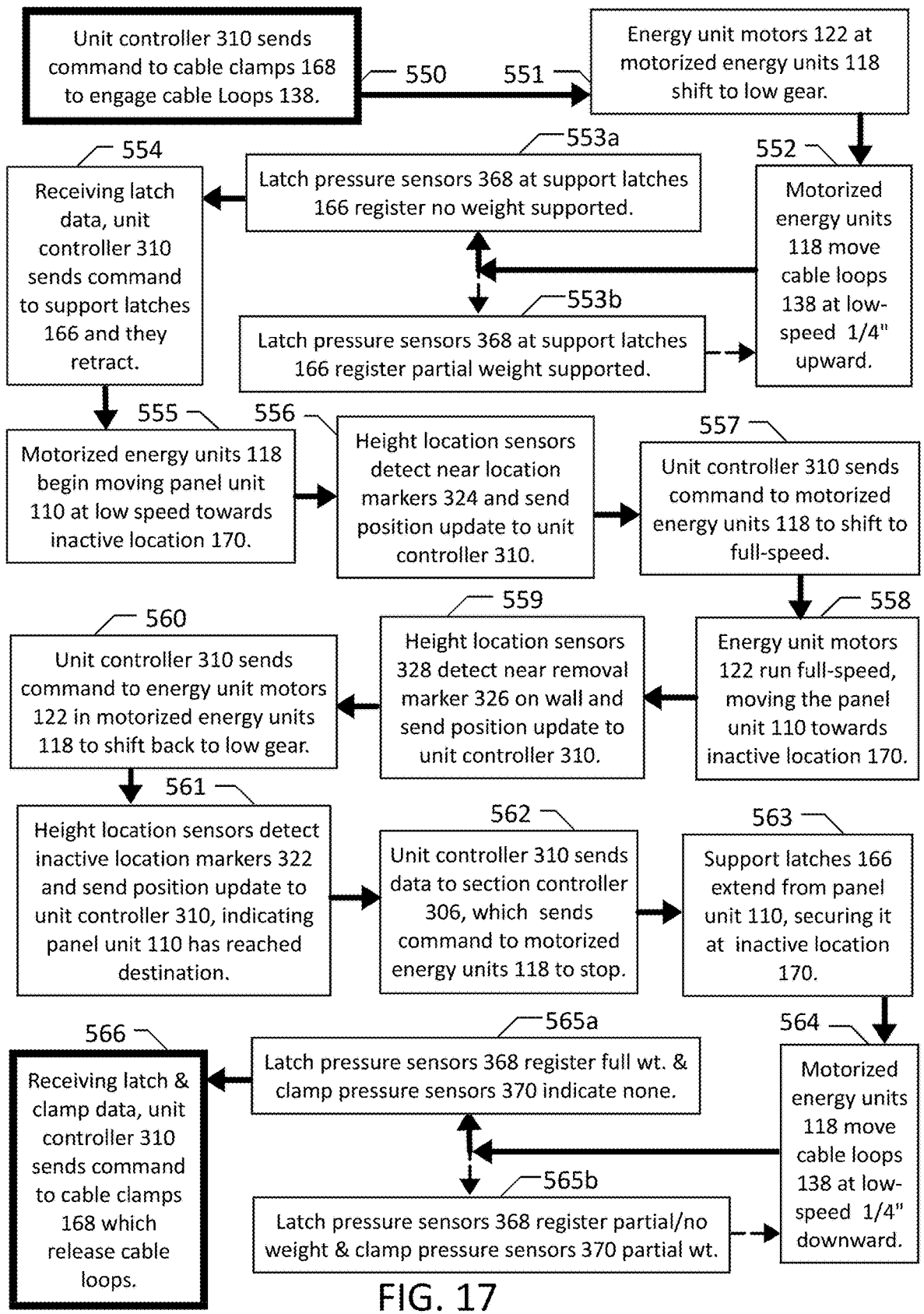
FIG. 17 is a flow diagram of the process by which the embodiment of FIGS. 1 through 11 operates to move panel unit 110 and secure it at inactive location 170 to allow for panel unit maintenance.
Figure 18:
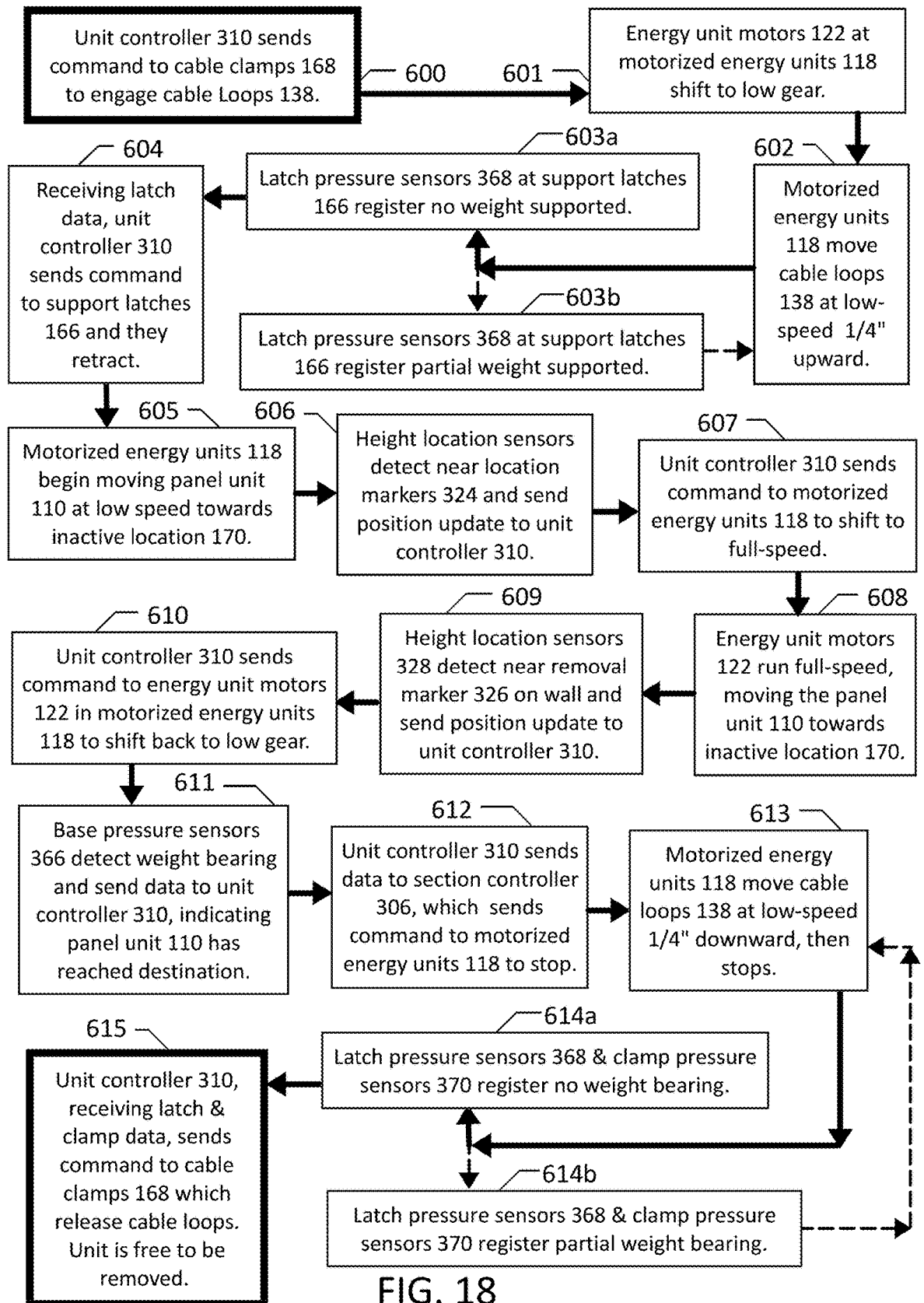
FIG. 18 is a flow diagram of the process by which the embodiment of FIGS. 1 through 11 operates to move panel unit 110 to rest at inactive location 170, then disengage from cable loops for panel unit removal.

An example of how the various controllers of FIGS. 12-15 interact is shown in FIGS. 16-18, which describe methods of installation, maintenance, and removal of panel units 110 via first commands.

Installation:

In order to install a panel unit, it is first placed in the inactive location 170 as shown in FIG. 1

The installation process occurs as follows:

At step 500, if the base pressure sensors indicate that the weight of the unit is bearing upon a horizontal surface below at the inactive location 170, unit controller 310 sends information to panel section controller 306 via path 406 (FIG. 14), which communicates with assembly controller 304 via path 403, which communicates with system controller 302 via path 405. At step 501, the panel unit 110 is switched to "active" mode. This can be done either automatically via the system controller 302, or manually via an operator at the EMCS 342 which then communicates with the system controller 302 via path 407. System controller 302 then communicates with assembly controller 304 via path 405 (FIG. 12), which then communicates with section controller 306 via path 403, which directs panel unit controller 310 to command the clamp actuators 264 via path 420 to engage the cable clamps 168 (step 502). Clamp pressure sensors 370 at the cable clamps 168 provide feedback via path 422 to inform unit controller 310 that they are engaged. The unit controller 310 then communicates with the panel section controller 306 via path 406 to turn on the energy unit motor at low speed (step 503). The panel section controller commands the drive controller (308) via path 404 to signal the energy unit motor via path 408 to run at slow speed. At step 504, the base pressure sensors 366 signal the unit controller 310 via path 424 that the panel unit is no longer bearing upon a surface below. The unit controller 310 then communicates with the panel section controller via path 406, which then directs the drive controller 308 via path 404 which then sends a command to the energy unit motor via path 408 to run at full speed. At step 505, the height location sensors 328 read that the panel unit 110 is passing or has passed the near-location marker 324, and sends data to the unit controller 310 via path 426. The unit controller 310 then sends data to the panel section controller via path 406, which then sends a command to the drive controller 308 via path 404 to run at low speed, which it relays to the energy unit motor via path 408. At step 506, the height location sensors 328 read that the panel unit 110 has reached the operation location marker 320, and sends data to the unit controller 310 via path 426. The unit controller 310 then sends data to the panel section controller via path 406, which then sends a command to the drive controller 308 via path 404 to stop, which it relays to the energy unit motor via path 408. At step 507, once the unit controller 310 receives notification via path 406 from the section controller 306 that the energy unit motor 122 has stopped, the unit controller commands the latch actuators 266 via path 416 to engage support latches 166. Support latches 166 engage support plates 130 as previously described. The latch pressure sensors 368 at support latches send feedback via path 418 to the unit controller 310, indicating that support latches 166 are engaged. Optionally, at step 508, the unit controller 310 communicates with the section controller 306 via path 406 to activate the energy unit motor at low speed and lower the panel unit slightly, in an embodiment, about one quarter inch. The latch pressure sensors 368 at support latches then send feedback via path 418 to the unit controller 310, indicating that support latches 166 are engaged and bearing the full weight of the panel unit 110.

At step 509, once the unit controller 310 has received data indicating that the support latches are engaged and weight bearing, the unit controller 310 then commands the clamp actuators 264 via path 420 to disengage the cable clamps 168. The cable clamps then send data to the unit controller 310 via path 422 that they are now disengaged.

Maintenance

Once a panel unit 110 is installed and in operational location 176, it will occasionally need to be maintained and/or serviced. In this case it should preferably be retracted into its inactive position and moved to the inactive location 170 and dis-engaged from the cable clamps 168.

An embodiment of a method for doing so is shown in FIG. 17. First, the unit controller 310 in panel unit 110 sends a command via path 420 to the cable clamps 168 to engage the cable loops 138 (Step 550). The clamp pressure sensors 370 send data via path 422 to the unit controller 310 indicating that the cable loops are engaged. At step 551, the unit controller 310 sends a message via path 412 to the section controller that the panel unit 110 is ready to move. The panel section controller 306 then sends a command to the drive controller 308 via path 404 to run at low speed, which it relays to the energy unit motor 122 via path 408. At step 552, the energy unit motor 122 now moves the cable loop 138 at low speed slightly upward, for example one quarter inch. At step 553b, if the latch pressure sensors 368 indicate via path 418 to the unit controller 310 full to partial weight support on the support latches 166, step 552 repeats and continues. At step 553a, if the latch pressure sensors 368 indicate via path 418 to the unit controller 310 no weight support on the support latches 166, then the process proceeds to step 554, where the unit controller 310 sends a command via path 416 to the latch actuators 266 to cause the support latches 166 to disengage. Latch pressure sensors 368 send feedback via path 418 to the unit controller 310 indicating that the support latches are disengaged. At step 555, the motorized energy units 118 begin moving the panel unit 110 at low speed towards the inactive location markers 322.

At step 556, the height detection sensors 328 sense the near location markers 324 and send position update information via feedback 426 to the unit controller 310. In response, at step 557, the unit controller 310 sends a command via path 412 to the unit motor 200 to run at full speed. At step 558, the unit motor 122 runs at full speed towards the inactive location 170. At step 559, the height location sensors 328 detect the near removal marker 326 and send position update information to the unit controller 310 via path 426. In response, at step 560, the unit controller 310 sends position update information via path 406 to panel section controller 306, which then sends a command to the drive controller 308 via path 404 to run at low speed, which it relays to the energy unit motors 122 via path 408. At step 561, the height location sensors 328 identify the inactive location markers 322 and send position update information via path 426 to the unit controller 310, indicating that the panel unit 110 has reached its destination. At step 562, the unit controller 310 conveys position update to the section controller 306 via path 406, and the section controller 306 conveys via path 404 a command to stop to the motorized energy units 118. At step 563, the unit controller 310 sends a command via path 416 to latch actuators 266 to cause support latches 166 to extend. At step 564, the section controller 306 conveys via path 404 a command to the motorized energy units 118 to move the cable loops 138 downward slightly, for example one quarter inch. At step 565b, if the latch pressure sensors 368 return feedback via path 418 indicating that there is partial or no weight on the support latches 166 or the clamp pressure sensors 370 indicate that there is partial weight on the cable clamps 168, step 564 repeats and continues. At step 565a, when the latch pressure sensors 368 indicate full weight bearing via path 418 and the cable clamp sensors 370 indicate no weight bearing via path 422, then at step 566, the unit controller 310 sends a command via path 420 to clamp actuators 264 to release cable clamps 168 from the cable loops 138. The panel unit 110 is now ready for servicing.

Removal

A panel unit 110 may occasionally need to be removed for replacement, repair, upgrade, or the like. The process for removal is shown in FIG. 18. Steps 600-610 are the same as the steps for maintenance as shown and described with respect to FIG. 17. Then, at step 611, base pressure sensors 366 detect weight bearing and send data via path 424 to the unit controller 310, indicating the panel unit 110 has reached its destination and is now resting on a horizontal surface below. At step 612, the unit controller 310 conveys position update information via path 406 to the section controller 306, which in turn sends a command via path 404 to the motorized energy unit to stop. At step 613, the motorized energy units 118 move the cable loops 138 at low speed slightly downward, then stop. At step 614*b*, if either the latch pressure sensors 368 return feedback via path 418 indicating that there is partial weight bearing on the support latches 166 or the clamp pressure sensors 370 indicate that there is partial weight on the cable clamps 168, the process (feedback loop in flow diagram) returns to step 613 and repeats. At step 614*a*, when the latch pressure sensors 368 provide feedback indicating no weight bearing via path 418 and the cable clamp sensors 370 indicate no weight bearing via path 422, then at step 615 the unit controller 310 sends a command via path 420 to clamp actuators 264 to release cable clamps 168 from the cable loops 138. The panel unit 110 is now free to be removed.

Panels

Figure 19:
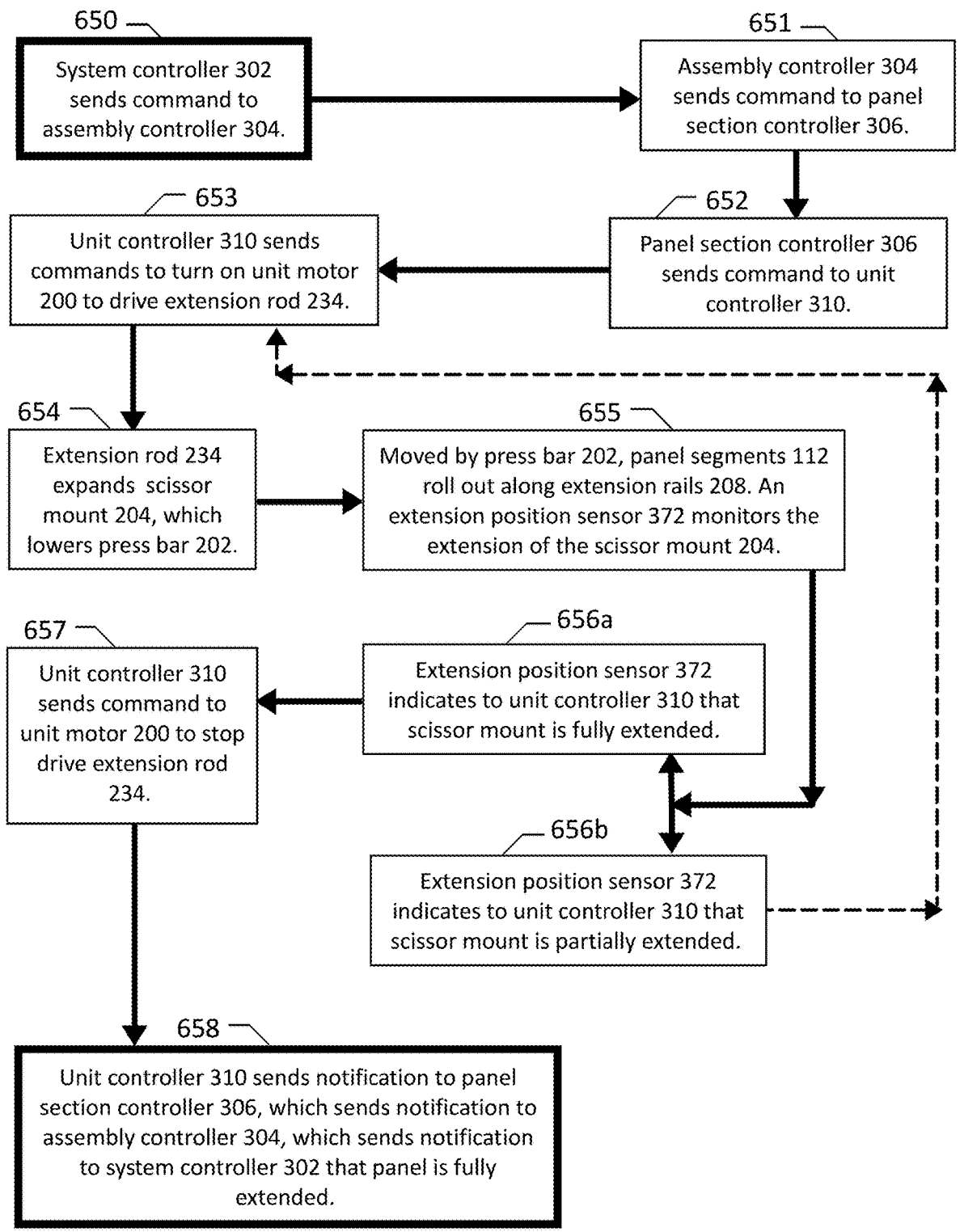
FIG. 19 is a flow diagram of the process by which the embodiment of FIGS. 1 through 11 operates to unfold panel segments 112 from within the unit housing 160 to extend horizontally outward from the panel unit.
Figure 20:
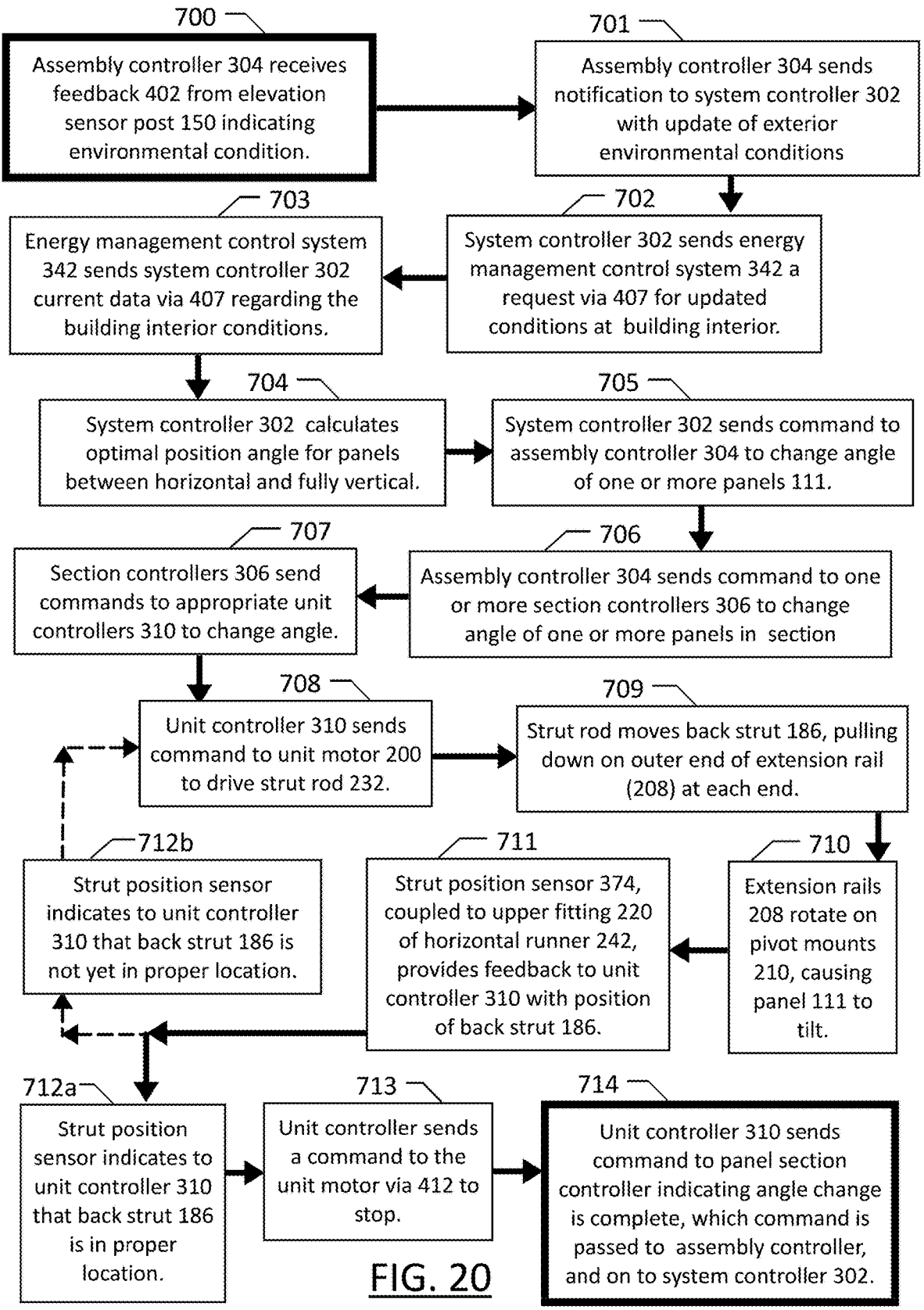
FIG. 20 is a flow diagram of the process by which the embodiment of FIGS. 1 through 11 operates to adjust the angle at which panel units project from the building, to optimize energy production of the system and comfort within the building.
Figure 21:
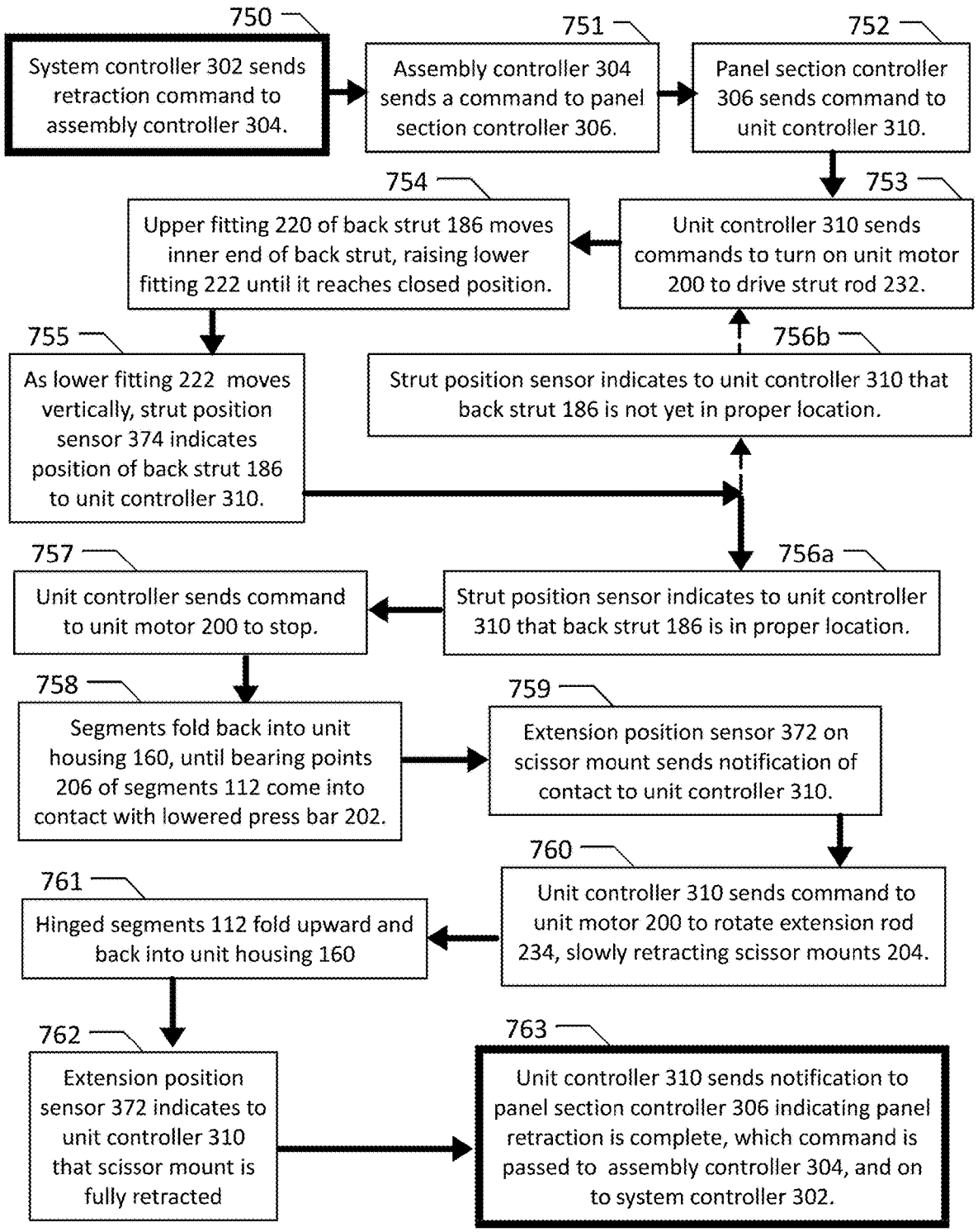
FIG. 21 is a flow diagram of the process by which the embodiment of FIGS. 1 through 11 operates to retract panel segments 112 from a fully extended, angled operational position, to fold back into unit housing 160.

An example of how the various controllers of FIGS. 12-15 interact is shown in FIGS. 19-21, which describe methods of extension, angling, and retraction of panels 111 via second commands.

Panel Extension

When a panel unit 110 is in operational location, its respective active panel 111 can then be extended. An embodiment of a method for doing so is shown in FIG. 19, with reference to FIGS. 12-15 and FIGS. 9-11. At step 650, The system controller 302 sends a command via 405 to an assembly controller 304, which in turn sends a command via 403 to a panel section controller 306, which in turn sends a command via 406 to the unit controller 310. At step 653, Unit controller 310 sends commands via 412 to turn on unit motor 200 to drive extension rod 234. The extension rod 234 expands the scissor mount 204, which lowers the press bar 202 to cause the panel segments 112 to roll out along the extension rail 208. An extension position sensor 372 monitors the extension of the scissor mount 204. In accordance with an embodiment (at step 655), the extension position sensor 372 monitors the extension of the scissor mount 204. (feedback loop in flow diagram) When the extension position sensor 372 indicates via feedback 428 to unit controller 310 that the scissor mount is fully extended, the unit controller 310 sends a command via 406 to the panel section controller 306, which sends a command via 403 to the assembly controller 304, which sends a command via 405 to the system controller 302 to indicate that the active panel is now extended to the determined position.

In accordance with an embodiment, when the extension position sensor 372 indicates via feedback 428 to unit controller 310 that the scissor mount is fully extended (step 656*a*), the unit controller 310 sends command to unit motor 200 to stop drive extension rod 234. Unit controller 310 then sends notification via 406 to the panel section controller 306, which sends notification via 403 to the assembly controller 304, which sends notification via 405 to the system controller 302 to indicate that the panel is now fully extended.

Panel Angling

When a panel 111 is in the extended position, it may be desirable to change the angle of the panel 111, for example to maximize energy production by the panel 111. The panel can be tilted to any angle between horizontal (as oriented upon initial extension) and vertical. There are several ways that the panel angle can be controlled. First of all, a building energy manager who is monitoring the building energy management system 340 can monitor the system and input commands to system controller 302 to change the angle of a given panel 111, or all panels in a panel section 108 or an assembly 106. Or, the elevation sensor post 150 may provide feedback via 402 indicating environmental conditions that can be responded to by changing the angle of one or more panels 111. Response to environmental conditions can be fed back from the assembly controller 304 to system controller 302 to be responded to by a system manager, or can be responded to automatically by the system controller 302, or can be responded to by the assembly controller 304 without involving the system controller 302 other than to feed back the fact that the angle change has occurred.

The method as shown in FIG. 20 is one example of changing the angle of a panel wherein the system controller 302 is involved and panel angle is changed in response to environmental conditions. At step 700, the assembly controller 304 receives feedback 402 from the elevation sensor post 150 indicating environmental condition. In this example the system controller 302 calculates the angle change that will maximize energy output for the given assembly. The assembly controller sends a notification via 405 to the system controller 302 (step 701) indicating an update of exterior environmental conditions. The system controller 302 sends to the energy management control system 342 a request via 407 for updated conditions at the building interior. The energy management control system 342 sends the system controller 302 current data via 407 regarding building interior conditions (step 703). The system controller 302 then calculates the optimal position angle for panels between horizontal and fully vertical (step 704). The system controller 302 sends a command to the assembly controller via 405 to change the angle of one or more panels 111, for example, downward (step 705). The assembly controller 304 sends a command via 403 to one or more section controllers 306 to change the angle of one or more panels in the section (step 706). Depending on the contents of the command (i.e. which panel in the section should change angle), each given section controller 306 sends a command via 406 to each appropriate unit controller 310 to change angle, in this case, downward a certain degree (step 707). The unit controller 310 sends a command to the unit motor 200 to drive the strut rod 232 (step 708). A strut position sensor 374 coupled to the upper fitting 220 of the horizontal runner 242 of the back strut 186 (FIG. 9) indicates feedback via 430 with the position of the back strut 186 to the unit controller 310. When the feedback 430 from the strut position sensor indicates to the unit controller 310 that the back strut 186 is in the proper location, the unit controller sends a command to the unit motor via 412 to stop (step 713). The unit controller 310 then sends a command via 406 to the panel section controller indicating angle change is complete, which command is passed via 403 to the assembly controller, and on via 405 to the system controller 302 (step 714).

Panel Retraction

When a panel unit 110 is in operational location, and its respective active panel 111 is extended in the operational position, it can also be retracted back into the unit housing 160. An embodiment of a method for doing so is shown in FIG. 21, with reference to FIGS. 12-15 and FIGS. 9-11.

At step 750, The system controller 302 sends a command via 405 to an assembly controller 304, which in turn sends a command via 403 to a panel section controller 306, which in turn sends a command via 406 to the unit controller 310. At step 753, Unit controller 310 sends commands via 412 to turn on unit motor 200 to drive strut rod 232, in the opposite direction from that required to tilt the panel 111 downward. The upper fitting 220 of the back strut 186 is thus driven, as described with regard to FIG. 9, to cause the lower fitting 222 of each back strut to move upward (step 754) until it returns to its closed position. At step 755, as the lower fitting 222 of the back strut 186 moves vertically, the strut position sensor 374 indicates via feedback 430 the position of the strut rod to the unit controller 310. When the feedback 430 from the strut position sensor indicates to the unit controller 310 that the strut rod is in the proper location (step 756*a*), the unit controller sends a command (step 757) to the unit motor 200 via 412 to stop. The segments fold back (step 758) into the unit housing 160, until the bearing points 206 of the segments 112 come into contact with the lowered press bar 202. At step 759, the extension position sensor 372 on the scissor mount sends notification of contact to the unit controller 310. The unit controller 310 then sends a command to the unit motor 200 to rotate extension rod 234 (step 760), slowly retracting the scissor mounts 204 at each end of the press bar 202, and at step 761, allowing the hinged segments 112 to fold upward and back into the unit housing 160. In accordance with an embodiment, when the extension position sensor 372 indicates via feedback 428 to unit controller 310 that the scissor mount is fully retracted (step 762), then at step 763, the unit controller 310 sends notification via 406 to the panel section controller 306, which sends a notification via 403 to the assembly controller 304, which sends a notification via 405 to the system controller 302 to indicate that the panel is now fully retracted.

What has been presented herein is a system for providing energy to a building. In an embodiment, the system includes one or more guide rails coupled to a building wall. A plurality of panel units is coupled to the one or more guide rails. An active panel is configured to extend and contract from each panel unit. Elements of control system are coupled to the guide rail and to each panel unit and configured to convey the panel units to a operational location on the building wall, and is also configured to extend or retract a respective active panel from or into its respective panel unit when the panel unit is in operational location, or in the inactive location to allow for service.

The active panel can further be configured to change angle relative to the building wall. The system controller can be further configured to change the angle of a panel unit relative to the building wall.

More particularly, the system controller can be configured to control provision of energy from the active panel to a building energy management system. And, can provide renewable energy, for example renewable energy provided by photovoltaic cells.

In an embodiment, several panel units are coupled between a pair guide rails. The guide rails can be disposed in vertical parallel relationship.

In an embodiment, the guide rails can include a center rigid member perpendicularly disposed from the building wall, a channel on a side of the rigid member, the channel being configured for receiving and securing an end of a panel unit between the guide rails; and a cable loop coupled to the rigid member.

In an embodiment, the panel unit can include a housing for holding a panel therein, guide rollers on each end of the housing for engaging a channel, a cable clamp on each end of the housing for engaging a cable loop, and a support latch on each end of the housing for engaging a support plate anchored to the building wall.

In an embodiment, the active panel can include several hinged panel segments that fold into the panel unit, and rollers on outside edges of the hinged panel segments. In this case, the panel unit also includes extension bars that are configured to extend from the panel unit, and a press bar that is configured to engage the folded hinged panel segments to cause the rollers to engage the extension bars to cause the hinged panel segments to cause the panel segments to extend from the panel unit.

In an embodiment, the control system includes provisions to direct the actions of a motorized energy unit configured to provide conveyance of the panel unit via the guide rails. A unit motor is located within the panel unit, and is configured to activate components within the panel unit that provide conveyance of the panel unit, and is configured to activate components that extend and contract the active panel. A system controller is configured to monitor sensors providing feedback indicating conveyance of the panel unit, monitor sensors providing feedback indicating movement of the panel; monitor sensors providing feedback indicating environmental conditions, send information to the building energy management system in response to the monitored feedback, receive commands from the building energy management system, send commands to the motorized energy unit and the unit motor to cause conveyance of the panel unit in response to first commands from the system controller, and send commands to the unit motor to cause extension or retraction of the active panel in response to second commands from the system controller.

In this embodiment, the control system can further include a motorized energy unit configured to activate the cable loops to convey the panel units to said operational location. A unit motor is located within the panel unit and configured to activate cable clamps, support latches, extension bars, and a press bar within the panel unit. A unit controller is configured to control the unit motor to drive actuators that activate the cable clamps and support latches, and configured to monitor sensors related to movement of the panel unit. A section controller is coupled to the unit controller and to the motorized energy unit. The section controller can drive the motorized energy unit in response to communication from the panel unit controller as cable loop drive is needed.

Further, an assembly controller is coupled to the section controllers and to an elevation sensor post. The elevation sensor post is configured to monitor environmental conditions.

A system controller is coupled to the assembly controllers and to the building energy management system. The system controller can indicate feedback regarding the operation of the panels and environmental conditions to the building energy management system.

The system controller is configured to receive commands from the building energy management system. The system controller can communicate with the assembly controller and the section controller and the unit controller to execute commands that including extending or retracting the respective active panel from or into its respective panel unit, and controlling provision of energy from the active panel to a building energy management system.

Furthermore, the active panel is further configured to change angle relative to the building wall, and the system controller is further configured to, when a panel unit is in operational location, extend or retract the respective active panel from or into its respective panel unit, or change the angle of a panel unit relative to the building wall.

Also presented herein are methods, including the steps of providing one or more panel units, each for installation on one or more guide rails on a building wall. Each panel unit includes an active panel configured to extend and contract from its respective panel unit. The method includes the steps of conveying the one or more panel units to an operational location on the building wall, and, when a panel unit is in an operational location, extending or retracting its respective active panel from or into its respective panel unit.

The method further includes the step of changing the angle of a panel unit when the panel unit is in operational position. In this method, energy can be transferred from the active panel to a building energy management system. Further, the active panel can provide renewable energy, wherein the renewable energy is provided by photovoltaic cells.

The step of conveying one of the one or more panel units can include engaging a cable clamp for attachment to a cable on the one or more guide rails, turning on a motor to convey the panel unit, engaging a support latch to couple the panel unit to the building wall and disengaging the cable clamp.

Furthermore, the active panel can further include several hinged panel segments that fold into the panel unit and rollers on outside edges of the hinged panel segments. The step of extending or retracting the respective active panel then includes extending extension bars from the panel unit, and engaging a press bar with the folded hinged panel segments to cause the rollers to engage the extension bars to cause the hinged panel segments to extend from the panel unit.

The active panels may provide energy to a building energy management system, including the steps of, monitoring sensors providing feedback indicating conveyance of the panel unit, monitoring sensors providing feedback indicating movement of the active panel, monitoring sensors providing feedback indicating environmental conditions, sending commands to the building energy management system in response to the monitored feedback, receiving commands from the building energy management system, conveying the panel unit in response to first commands, and extending or retracting the active panel in response to second commands. Furthermore, the method may include changing the angle of the active panel in response to second commands.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system comprising:
   one or more guide rails coupled to a building wall wherein the guide rails are disposed in vertical positions along the building wall;
   a plurality of panel units individually coupled to the one or more guide rails and secured by one or more channels, with said panel units capable of changing locations at variable intervals along the length of the one or more guide rails through guide rollers within the channels;
   a control system coupled to the guide rail and to each panel unit and configured to:
      automatically move the multiple, individual panel units along the length of the one or more guide rails, individually or in unison, to one of a plurality of separate, inactive and/or operational locations at variable intervals along the building wall.

2. The system of claim 1 further comprises at least one vertical runner and at least one horizontal runner wherein an active panel within each panel unit is configured to:
   extend or retract from the panel unit;
   change angle relative to the building wall.

3. The system of claim 2 wherein the control system is further configured to, when a panel unit is in operational location, extend or retract the respective active panel from or into its respective panel unit, or change the angle of a panel unit relative to the building wall.

4. The system of claim 2 wherein the control system is configured to control provision of energy from the active panel to a building energy management system.

5. The system of claim 4 wherein the active panel provides renewable energy, wherein the renewable energy is provided by photovoltaic cells.

6. The system of claim 5 wherein a plurality of the panel units are coupled between a pair of the one or more guide rails.

7. The system of claim 6 wherein the guide rails are disposed in vertical parallel relationship and each comprise:
   a center rigid member perpendicularly disposed from the building wall;
   a channel on a side of the rigid member, the channel configured for receiving and securing an end of a panel unit between the guide rails;
   a cable loop coupled to the rigid member.

8. The system of claim 6 wherein the panel unit further comprises:
   a housing for holding an active panel therein;
   guide rollers on each end of the housing for engaging a channel;
   a cable clamp on each end of the housing for engaging a cable loop;
   a support latch on each end of the housing for engaging a support plate anchored to the building wall.

9. The system of claim 8 wherein the active panel further comprises:
   a plurality of hinged panel segments that fold into the panel unit;
   rollers on outside edges of the hinged panel segments;
   and wherein the panel unit further comprises:
      extension bars that are configured to extend from the panel unit;
      a press bar that is configured to engage the folded hinged panel segments to cause the rollers to engage the extension bars to cause the hinged panel segments to cause the panel segments to extend from the panel unit.

10. The system of claim 4 wherein the control system further comprises:
   a motorized energy unit configured to provide movement of the panel unit along the guide rails to said inactive or operational locations along the building wall;
   a unit motor located within the panel unit, configured to activate components within the panel unit that provide movement of the panel unit, and configured to activate components that extend or contract the active panel;
   a system controller configured to:
      monitor sensors providing feedback indicating movement of the panel unit;
      monitor sensors providing feedback indicating movement of the active panel;
      monitor sensors providing feedback indicating environmental conditions;
      send information to the building energy management system in response to the monitored feedback;
      receive commands from the building energy management system;
      send commands to the motorized energy unit and the unit motor to cause movement of the panel unit in response to first commands from the system controller;

send commands to the unit motor to cause extension or retraction of the active panel in response to second commands from the system controller.

11. The system of claim 4 wherein the control system further comprises:
a motorized energy unit configured to activate the cable loops to move the panel units to said inactive or operational locations along the building wall;
a unit motor located within the panel unit, configured to activate cable clamps, support latches, extension bars, or the press bar within the panel unit;
a unit controller configured to control the unit motor to drive actuators that activate the cable clamps and support latches, and configured to monitor sensors related to movement of the panel unit;
a section controller coupled to the unit controller and to the motorized energy unit, the section controller configured to communicate to drive the motorized energy unit in response to communication from the panel unit controller as cable loop drive is needed;
an assembly controller coupled to the section controller and to an elevation sensor post, the elevation sensor post configured to monitor environmental conditions;
a system controller coupled to the assembly controller and to the building energy management system, the system controller configured to indicate feedback regarding the operation of the panels and environmental conditions to the building energy management system;
the system controller also configured to receive commands from the building energy management system, the system controller communicating with assembly controller, the section controller and the panel unit controller to execute commands that include but are not limited to:
move the panel units to inactive or operational locations on the building wall;
when a panel unit is in operational location, extend or retract the respective active panel from or into its respective panel unit; and
control provision of energy from the active panel to a building energy management system.

12. The system of claim 11 wherein:
the active panel is further configured to change angle relative to the building wall; and
the system controller is further configured to, when a panel unit is in operational location, extend or retract the respective active panel from or into its respective panel unit, or change the angle of a panel unit relative to the building wall.

13. A method for a plurality of individual panel units coupled to one or more guide rails, for movable installation on a building, comprising the steps of:
controllably moving the plurality of individual panel units, separately or in unison along the length of the one or more guide rails, to one of a plurality of separate, inactive and/or operational locations, at variable intervals along the length of the one or more guide rails;
wherein the step of moving the plurality of individual panel units comprising the steps of:
engaging a cable clamp for attachment to a cable on the one or more guide rails;
turning on a motor to convey the panel unit;
engaging a support latch to couple the panel unit to the building wall;
disengaging the cable clamp.

14. The method of claim 13, for each panel unit including therein an active panel, further comprising the steps of:
extending or retracting an active panel from or into its panel unit;
changing the angle of an active panel.

15. The method of claim 14 wherein energy is transferred from the active panel to a building energy management system.

16. The method of claim 15 wherein the active panel provides renewable energy, wherein the renewable energy is provided by photovoltaic cells.

17. The method of claim 13 wherein the active panel further comprises a plurality of hinged panel segments that fold into the panel unit and rollers on outside edges of the hinged panel segments, and wherein the step of extending or retracting the respective active panel comprises:
extending extension bars from the panel unit;
engaging a press bar with the folded hinged panel segments to cause the rollers to engage the extension bars to cause the hinged panel segments to extend from the panel unit.

18. The method of claim 13 wherein the active panels provide energy to a building energy management system, further comprising the steps of:
monitoring sensors providing feedback indicating movement of the panel unit;
monitoring sensors providing feedback indicating movement of the active panel;
monitoring sensors providing feedback indicating environmental conditions;
sending commands to the building energy management system in response to the monitored feedback;
receiving commands from the building energy management system;
moving the panel unit in response to first commands;
extending or retracting the active panel in response to second commands.

19. The method of claim 18 further comprising the step of changing the angle of the active panel in response to second commands.

20. A system comprising:
one or more guide rails coupled to a building wall;
a plurality of panel units individually coupled to the one or more guide rails, with said panel units capable of being located at variable intervals along the length of the one or more guide rails;
a control system coupled to the guide rail and to each panel unit and configured to:
automatically move the multiple, individual panel units along the length of the one or more guide rails, individually or in unison, to one of a plurality of separate, inactive and/or operational locations at variable intervals along the one or more guide rails;
wherein the guide rails are disposed in vertical parallel relationship and each comprise:
a center rigid member perpendicularly disposed from the building wall;
a channel on a side of the rigid member, the channel configured for receiving and securing an end of a panel unit between the guide rails;
a cable loop coupled to the rigid member.

* * * * *